US008767426B2

(12) United States Patent  (10) Patent No.: US 8,767,426 B2
Tamaoka                    (45) Date of Patent:     Jul. 1, 2014

(54) MATRIX CONVERTER CONTROLLING APPARATUS

(71) Applicant: Panasonic Corporation, Osaka (JP)

(72) Inventor: Shuji Tamaoka, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/910,419

(22) Filed: Jun. 5, 2013

(65) Prior Publication Data

US 2013/0265812 A1     Oct. 10, 2013

Related U.S. Application Data

(63) Continuation of application No. PCT/JP2011/006875, filed on Dec. 8, 2011.

(30) Foreign Application Priority Data

Dec. 9, 2010  (JP) ................................ 2010-275123

(51) Int. Cl.
    *H02M 5/14*      (2006.01)
(52) U.S. Cl.
    USPC ............................................. 363/148; 363/10
(58) Field of Classification Search
    USPC ..................................... 363/2, 9, 10, 148–156
    See application file for complete search history.

(56) References Cited

U.S. PATENT DOCUMENTS 5,892,677 A *  4/1999  Chang ........................... 363/152
7,460,377 B2 * 12/2008  Lacaze ............................ 363/10
7,466,574 B2 * 12/2008  Lacaze ............................ 363/148
8,159,850 B2 *  4/2012  Manabe et al. ................ 363/149
8,299,737 B2   10/2012  Morita et al.
2010/0127652 A1  5/2010  Morita et al.

FOREIGN PATENT DOCUMENTS

| JP | 11-146649    | 5/1999  |
| JP | 2001-298953  | 10/2001 |
| JP | 2004-135462  | 4/2004  |
| JP | 2007-312585  | 11/2007 |
| JP | 2009-159812  | 7/2009  |
| JP | 2010-172067  | 8/2010  |

OTHER PUBLICATIONS

International Search Report of PCT Application No. PCT/JP2011/006875 dated Feb. 28, 2012.

* cited by examiner

*Primary Examiner* — Jessica Han
(74) *Attorney, Agent, or Firm* — McDermott Will & Emery LLP

(57) ABSTRACT

A matrix converter control apparatus includes three AC switches each including a first and a second switching elements connected in series. The first and the second switching devices each: have a first terminal, a second terminal, and a gate terminal; pass a current between the first terminal and the second terminal when a first voltage which is a voltage of the gate terminal with reference to a voltage of the first terminal is higher than a threshold voltage; interrupt a current flowing from the second terminal to the first terminal when the first voltage is lower than the threshold voltage; and pass a current from the first terminal to the second terminal when the first voltage is lower than the threshold voltage and the voltage of the gate terminal is higher than the threshold voltage with reference to a voltage of the second terminal.

9 Claims, 32 Drawing Sheets

MATRIX CONVERTER CONTROLLING APPARATUS

CROSS REFERENCE TO RELATED APPLICATIONS

This is a continuation application of PCT International Patent Application No. PCT/JP2011/006875 filed on Dec. 8, 2011, designating the United States of America, which is based on and claims priority of Japanese Patent Application No. 2010-275123 filed on Dec. 9, 2010. The entire disclosures of the above-identified applications, including the specifications, drawings and claims are incorporated herein by reference in their entirety.

FIELD

The present disclosure relates to direct conversion circuits and matrix converter controlling apparatuses, and in particular, to a direct conversion circuit for converting a three-phase alternating current (AC) signal to a single-phase AC signal using pulse-width modulation (PWM), and a matrix converter controlling apparatus using the same.

BACKGROUND

FIG. 21 is a diagram illustrating a conventional direct conversion circuit used in a matrix converter or the like of a direct conversion scheme (also referred to as AC direct scheme) cited in a number of documents such as Patent Literature (PTL) 1.

With the conventional direct conversion circuit illustrated in FIG. 21, AC switches S1 to S9 each of which has a breakdown voltage against both positive and negative voltage polarities are disposed as illustrated in FIG. 21.

As illustrated in (a) in FIG. 21, each of the AC switches (S1 to S9) has a configuration having two circuits connected in series, in which diodes and insulated gate bipolar transistors (IGBT) are connected in parallel to be oriented oppositely. Alternatively, as illustrated in (b) in FIG. 21, each of the AC switches has a configuration in which two IGBTs having reverse breakdown voltage are connected in parallel to be oriented oppositely.

The IGBT has a feature of having a high breakdown voltage with smaller conduction loss among high-current operation devices. Accordingly, in a matrix converter of the conventional directly conversion scheme (AC direct scheme), the IGBT is used as a switching element used in the AC switches. However, since the IGBT can pass through a current only unilaterally and the breakdown voltage in an opposite direction is weak, the configuration having two circuits connected in series, in which diodes and IGBTs are connected in parallel to be oriented oppositely as illustrated in (a) in FIG. 21 is generally employed. In addition, an IGBT whose reverse breakdown voltage is increased is also developed. With this, a reverse blocking IGBT in which IGBT chips are connected inversely in parallel to face each other is also used as an AC switch, as illustrated in (b) in FIG. 21.

Meanwhile, a power switching element formed of a nitride semiconductor which differs from a power switching element of silicon series such as IGBT is under development. Techniques related to an inverter using a feature of the power switching element is disclosed by PTL 2 and so on.

CITATION LIST

Patent Literature

[PTL 1] Japanese Unexamined Patent Application Publication No. 2004-135462

[PTL 2] Japanese Unexamined Patent Application Publication No. 2009-159812

SUMMARY

Technical Problem

However, the direct conversion circuit using the above-described IGBT has a problem described below.

FIG. 22A is a diagram which illustrates I-V characteristics of the IGBT. FIG. 22B is a diagram which illustrates I-V characteristics of the diode.

In the IGBT, a pn-junction is present between a collector and an emitter. With this, as illustrated in FIG. 22A, an offset voltage is generated due to the pn-junction between the collector and the emitter, irrespective of a magnitude of a current, when the IGBT passes through a current. Likewise, as illustrated in FIG. 22B, in the diode, an offset voltage is generated in a VF voltage irrespective of a magnitude of a current.

Accordingly, in the case of the AC switch illustrated in (a) in FIG. 21, conductive loss constantly occurs due to pn-junction offset voltages in both of the diode and the IGBT, irrespective of the magnitude of a current flowing through the switch. In addition, in the case of the AC switch illustrated in (b) in FIG. 21 as well, the conductive loss occurs due to the pn-junction offset voltage in the IGBT.

As a result, when a direct conversion circuit of a matrix converter is configured with an AC switch using the IGBT and the diode, there is a lower limit in the loss of the direct conversion circuit even in a region where a current flowing through the AC switch is small. This results in restriction on the lower limit of the power consumption of the matrix converter, and an upper limit is posed on the efficiency which indicates the ratio of output power with respect to input power.

In addition, a tail current passes through in the IGBT at the time of turnoff behavior of the IGBT due to an accumulation effect of a minority carrier. This deteriorates the switching loss at the time of turnoff. In the diode, a recovery current due to the accumulation effect of a minority carrier in the diode deteriorates the switching loss at the time of turnoff behavior of the IGBT. As a result, in the AC switches illustrated in (a) and (b) in FIG. 21, there is a lower limit in the switching loss. When these AC switches are used to configure a direct conversion circuit of a matrix converter, the switching loss has harmful effects on power consumption and efficiency of the matrix converter.

It is to be noted that the above-described PTL 2 merely discloses the technique which uses a nitride semiconductor as an inverter, and thus PTL 2 is not related to a matrix converter.

In view of the above, an object of the present disclosure is to provide a matrix converter control apparatus which is capable of reducing the loss and improve the efficiency.

Solution to Problem

In order to achieve the above described object, a direct conversion circuit according to an aspect of the present disclosure is a direct conversion circuit for converting a three-phase alternating current (AC) signal to a single-phase AC signal using pulse width modulation (PWM), wherein the direct conversion circuit includes: three AC input terminals to which the three-phase AC signal is supplied; six gate signal input terminals to which six gate signals are provided; an output terminal for outputting the single-phase AC signal; and three AC switches each of which is connected between a corresponding one of the three AC input terminals and the output terminal, each of the three AC switches includes a first switching element and a second switching element connected in series between the corresponding AC input terminal and the output terminal, each of the first switching element and the second switching element includes a first terminal, a second terminal, and a gate terminal, and: passes a current from the first terminal to the second terminal or from the second terminal to the first terminal, according to a polarity of a voltage applied between the first terminal and the second terminal when a first voltage is higher than a threshold voltage, the first voltage being a voltage of the gate terminal with reference to a voltage of the first terminal; interrupts a current flowing from the second terminal to the first terminal when the first voltage is lower than or equal to the threshold voltage; and passes a current from the first terminal to the second terminal when the first voltage is lower than or equal to the threshold voltage and the voltage of the gate terminal is higher than or equal to the threshold voltage with reference to a voltage of the second terminal, the direct conversion circuit further includes six pre-drive circuits each of which (i) corresponds to a different pair of corresponding ones of six gate signals and the six switching elements, and (ii) supplies a voltage between the first terminal and the gate terminal of the switching element of the corresponding pair according to the gate signal of the corresponding pair, the six switching elements being included in the three AC switches.

According to the above-described configuration, with the direct conversion circuit according to an aspect of the present disclosure, an offset voltage due to the pn-junction as in the IGBT is not generated in the first voltage when a current is passed between the first terminal and the second terminal in the switching element used in the AC switch. With this, it is possible to reduce the conduction loss in the switching element. In addition, the AC switch does not have to include a diode, the offset voltage due to the diode is not generated, either. With this, it is possible to reduce the conduction loss in the switching element. In addition, with the reduction of the diodes, it is possible to implement reduction in the number of components, the costs, and the size of the direct conversion circuit. As described above, the direct conversion circuit according to an aspect of the present disclosure is capable of reducing the loss and improving the efficiency.

In addition, the second terminal of the first switching element and the second terminal of the second switching element may be connected to each other, the first terminal of the first switching element may be connected to the output terminal, and the first terminal of the second switching element may be connected to the AC input terminal.

In addition, the first terminal of the first switching element and the first terminal of the second switching element may be connected to each other, the second terminal of the first switching element may be connected to the output terminal, and the second terminal of the second switching element may be connected to the AC input terminal.

In addition, each of the first switching element and the second switching element may include: a semiconductor stacked body including a nitride semiconductor formed on a semiconductor substrate; a first electrode and a second electrode formed, spaced from each other, on the semiconductor stacked body, the first electrode and the second electrode serving as the first terminal and the second terminal, respectively; and a gate electrode formed between the first electrode and the second electrode, the gate electrode serving as the gate terminal.

According to the above-described configuration, the direct conversion circuit according to an aspect of the present disclosure is capable of reducing the effect of minority carrier of the switching element. With this, in the switching element, a tail current at the time of turnoff that exists in the IGBT is barely generated. Therefore, the direct conversion circuit is capable of further reducing the switching loss. In addition, the AC switch can eliminate the effect of switching loss due to a diode recovery current.

In addition, each of the three switching elements may include: a semiconductor stacked body including a nitride semiconductor formed on a semiconductor substrate; a first electrode and a second electrode, spaced from each other, formed on the semiconductor stacked body, the first electrode and the second electrode serving as the first terminal of the first switching element and the first terminal of the second switching element, respectively; and two gate electrodes formed between the first electrode and the second electrode, each of the gate electrodes serving as the gate terminal of a corresponding one of the first switching element and the second switching element.

According to the above-described configuration, in the direct conversion circuit according to an aspect of the present disclosure, the AC switch can be formed by a single semiconductor chip, and thus it is possible to reduce the size of the AC switch. As a result, it is possible to further reduce the size of the direct conversion circuit.

In addition, the switching element may be a metal-oxide semiconductor field-effect transistor (MOSFET).

In addition, a matrix converter control apparatus according to an aspect of the present disclosure may be a matrix converter control apparatus for converting a three-phase alternating current (AC) signal to a single-phase AC signal using pulse width modulation (PWM), the matrix converter control apparatus may include a matrix converter which includes the direct conversion circuit, and a PWM control unit configured to generate a PWM control signal from which the six gate signals are generated, and supply the generated PWM control signal to the matrix converter.

According to the above-described configuration, the matrix converter control apparatus according to an aspect of the present disclosure can implement the matrix converter operation of three-phase AC to single-phase PWM which properly drives the above-described direct conversion circuit.

In addition, the matrix converter control apparatus may further include an input voltage detecting circuit which detects a voltage value of each phase of the three-phase AC signal, the matrix converter may further include a drive control unit configured to (i) control the direct conversion circuit by generating the six gate signals using the PWM control signal, (ii) at predetermined intervals, determine, based on a result of detection performed by the input voltage detecting circuit, a first phase signal which is a signal of a phase in which a voltage has a highest absolute value in the three-phase AC signal, a second phase signal which is a signal other than the first phase signal in the three-phase AC signal, and a third phase signal which is a signal other than the first phase signal and the second phase signal in the three-phase AC signal, (iii) put a third AC switch into an interruption state, the third AC switch being one of the three AC switches to which the third phase signal is supplied via the AC input terminal, and (iv) generate the single-phase AC signal using a first AC switch and a second AC switch, the first AC switch being one of the three AC switches to which the first phase signal is supplied via the AC input terminal, and the second AC switch being one of the three AC switches to which the second phase signal is supplied via the AC input terminal.

According to the above-described configuration, it is possible, for example, to easily perform system change to the matrix converter control apparatus from the driving system of a conventionally existing half bridge PWM inverter control apparatus which extracts AC power of an arbitrary frequency from a DC power.

In addition, the drive control unit may switch a signal to be determined as the second phase signal alternately between the signals of two phases other than the first phase signal.

In addition, the input voltage detecting circuit may generate a PWM output correcting signal indicating an absolute value of a difference between the first phase signal and the second phase signal, the matrix converter control apparatus may further include a PWM gain correcting circuit which generates a PWM gain correcting signal for correcting the PWM control signal according to the PWM output correcting signal to cause the single-phase AC signal generated by the direct conversion circuit to approximate the single-phase AC signal generated when the absolute value of the difference is constant, and the PWM control unit may correct a duty of the PWM control signal according to the PWM gain correcting signal.

According to the above-described configuration, the matrix converter control apparatus according to an aspect of the present disclosure is capable of more accurately extracting an AC power of an arbitrary frequency from the three-phase AC power.

In addition, a matrix converter control apparatus according to an aspect of the present disclosure is a matrix converter control apparatus for converting a three-phase alternating current (AC) signal to a two-phase AC signal using pulse width modulation (PWM), the matrix convertor control apparatus may include a first matrix converter and a second matrix converter each of which includes a direct conversion circuit; and a PWM control unit, wherein the PWM control unit may generate a first PWM control signal from which the six gate signals of the direct conversion circuit included in the first matrix converter are generated, supply the generated first PWM control signal to the first matrix converter, generate a second PWM control signal from which the six gate signals of the direct conversion circuit included in the second matrix converter are generated, and supply the generated second PWM control signal to the second matrix converter.

According to the above-described configuration, the matrix converter control apparatus according to an aspect of the present disclosure can implement the matrix converter operation of three-phase AC to two-phase PWM which properly drives the above-described direct conversion circuit.

In addition, a matrix convertor control apparatus according to an aspect of the present disclosure is a matrix convertor control apparatus for converting a three-phase alternating current (AC) input signal to a three-phase AC output signal using pulse width modulation (PWM), the matrix convertor control apparatus including: a first matrix converter, a second matrix converter, and a third matrix converter each of which includes the direct conversion circuit; and a PWM control unit, wherein the PWM control unit may generate a first PWM control signal from which the six gate signals of the direct conversion circuit included in the first matrix converter are generated, supply the generated first PWM control signal to the first matrix converter, generate a second PWM control signal from which the six gate signals of the direct conversion circuit included in the second matrix converter are generated, and supply the generated second PWM control signal to the second matrix converter, generate a third PWM control signal from which the six gate signals of the direct conversion circuit included in the third matrix converter are generated, and supply the generated third PWM control signal to the third matrix converter.

According to the above-described configuration, the matrix converter control apparatus according to an aspect of the present disclosure can implement the matrix converter operation of three-phase AC to three-phase PWM which properly drives the above-described direct conversion circuit.

It is to be noted that the present disclosure can be embodied not only as a direct conversion circuit and a matrix converter controlling apparatus but also a method of driving the direct conversion circuit having, as steps, the characteristic units included in the matrix converter controlling apparatus or a method of controlling the matrix converter, or as a program which causes a computer to execute such characteristic steps. In addition, it should be understood that such a program can be distributed via a non-transitory computer readable recording medium such as a CD-ROM and a transmission medium such as the Internet.

Furthermore, the present disclosure can be embodied as a semiconductor integrated circuit (LSI) which implements part or all of the functions of the direct conversion circuit or the matrix converter controlling apparatus.

Advantageous Effects

The present disclosure can provide a direct conversion circuit and a matrix converter controlling apparatus which can reduce the loss and improve the efficiency.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DESCRIPTION OF EMBODIMENTS

The following sequentially describes in detail preferred embodiments of a direct conversion circuit used for use in a matrix converter, a matrix converter controlling apparatus which drives the direct conversion circuit, and a method of driving the direct conversion circuit employed by the matrix converter controlling apparatus according to the present disclosure, with reference to the attached drawings.

It is to be noted that, the present disclosure is not limited to the specific configurations described in the exemplary embodiments below, but includes configurations based on technical ideas equivalent to technical ideas described in the exemplary embodiments and common technical knowledge in this field. The numerical values, shapes, materials, structural elements, the arrangement and connection of the structural elements, steps, the processing order of the steps etc. shown in the following embodiments are mere examples, and therefore do not limit the scope of the Claims. The present disclosure is limited only by the scope of the claims. Thus, among the structural elements in the embodiments below, the structural elements which are not described in the independent claims that indicate the broadest concept of the present disclosure are not necessarily required for solving the problem of the present disclosure, but are explained as components for a more preferred embodiment.

Embodiment 1

Figure 1:
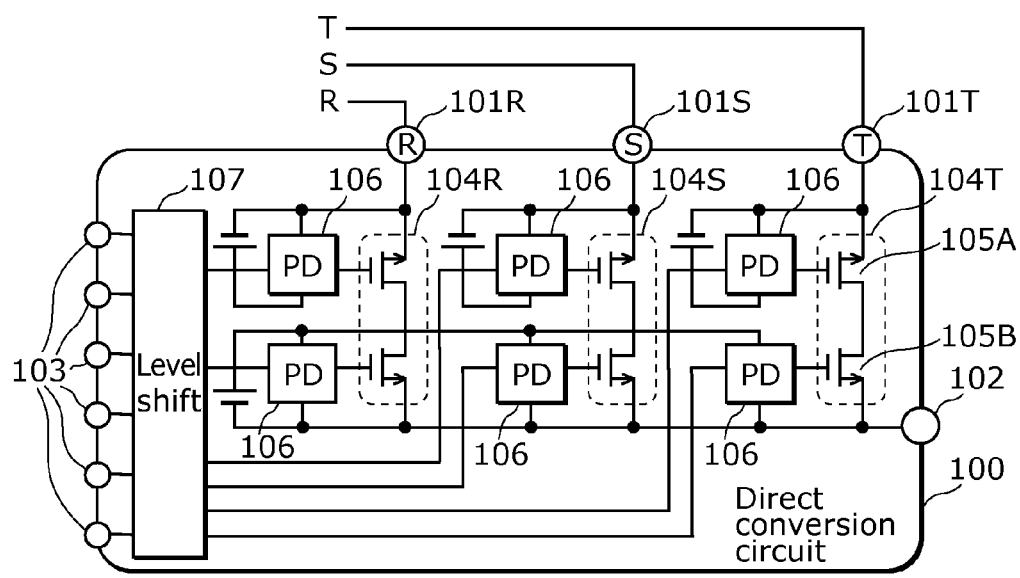
FIG. 1 is a diagram which illustrates a configuration of a direct conversion circuit according to Embodiment 1 of the present disclosure.

FIG. 1 is a diagram which illustrates a configuration of a direct conversion circuit according to Embodiment 1 of a direct conversion circuit of the present disclosure. The following describes the configuration of ht direct conversion circuit according to Embodiments of the present disclosure with reference to FIG. 1.

The direct conversion circuit 100 as illustrated in FIG. 1 is a direct conversion circuit for a single-phase for use in a matrix converter and the like. The direct conversion circuit 100 includes: three AC input terminals 101R, 101S, and 101T to which a three-phase AC signal is supplied; an output terminal 102; and six gate signal input terminals 103 to which a gate signal is supplied. It is to be noted that, when the three AC input terminals 101R, 101S, and 101T are not particularly discriminated, they are referred to as the AC input terminals 101.

The direct conversion circuit 100 is controlled by the gate signal supplied to the gate signal input terminals 103. The direct conversion circuit 100 converts the three-phase AC signal supplied to the AC input terminal 101 into the single-phase AC signal using pulse width modulation, and outputs the converted single-phase AC signal to the output terminal 102. In other words, the direct conversion circuit 100 converts the three-phase AC signal to the single-phase AC signal of an arbitrary frequency.

In addition, the direct conversion circuit 100 include: three AC switches 104R, 104S, and 104T, six pre-drive circuits 106, and a level-shift circuit 107. It is to be noted that, when the three AC switches 104R, 104S, and 104T are not particularly discriminated, they are referred to as the AC switches 104.

The three AC switches 104 are connected between the three-phase AC input terminals 101 and the output terminal 102. More specifically, the AC switch 104R is connected between the AC input terminal 101R and the output terminal 102. The AC switch 104S is connected between the AC input terminal 101S and the output terminal 102. The AC switch 104T is connected between the AC input terminal 101T and the output terminal 102.

Each of the AC switches 104 has two control terminals (gate terminals) capable of performing current control bi-directionally. The AC switch 104 is a bidirectional switching element having two gate terminals, and is equivalent to a combination of two bidirectional switching elements 105 each of which has a gate terminal having a feature described below.

The bidirectional switching element 105 having a single gate terminal includes: the gate terminal which performs current control; and a first terminal and a second terminal for inflow and outflow of current. In addition, one of the first terminals is referred to as a source terminal and the other is referred to as a drain terminal below.

Figure 2A:
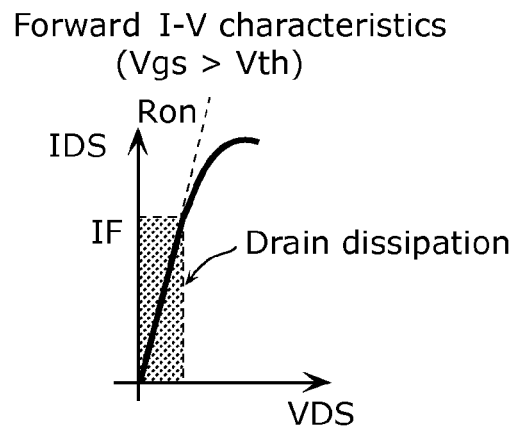
FIG. 2A is a diagram which illustrates current-voltage characteristics of a switching element according to Embodiment 1 of the present disclosure.
Figure 2B:
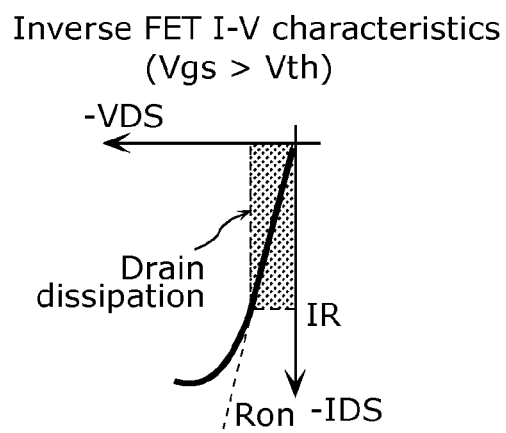
FIG. 2B is a diagram which illustrates current-voltage characteristics of a switching element according to Embodiment 1 of the present disclosure.
Figure 2C:
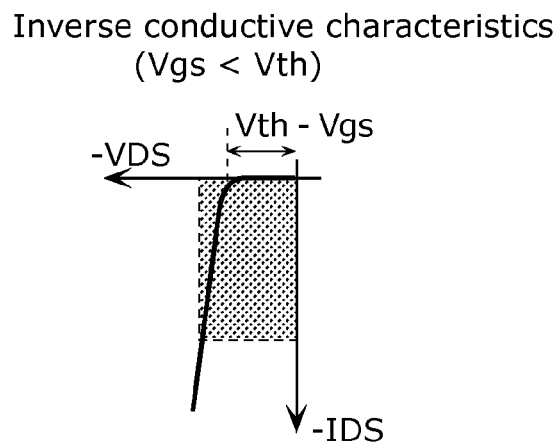
FIG. 2C is a diagram which illustrates current-voltage characteristics of a switching element according to Embodiment 1 of the present disclosure.

In addition, the switching element 105 has current-voltage characteristics illustrated in FIG. 2A, FIG. 2B, and FIG. 2C. The following describes these characteristic diagrams.

FIG. 2A and FIG. 2B are diagrams which illustrate a relationship between (i) a voltage VDS between the drain terminal and the source terminal and (ii) a current IDS that passes from the drain terminal to the source terminal or from the source terminal to the drain terminal, when a gate-source voltage Vgs that is a voltage of a gate terminal voltage with reference to a source terminal voltage is higher than a threshold voltage Vth. As illustrated in FIG. 2A and FIG. 2B, when the voltage Vgs is higher than a threshold voltage Vth, the switching element 105 is capable of passing through the current IDS from the source terminal to the drain terminal, or from the drain to the source according to a polarity and a value of the voltage VDS.

Figure 22A:
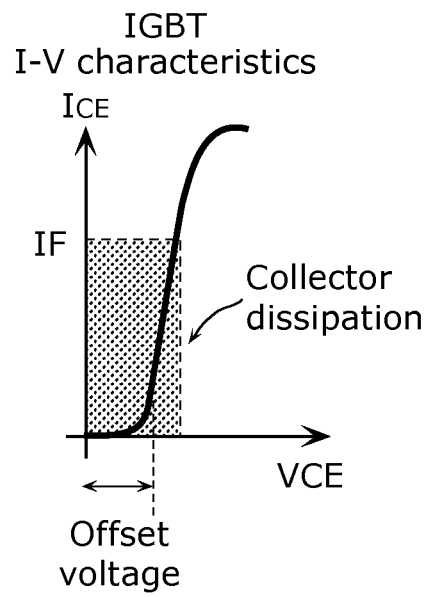
FIG. 22A is a diagram which illustrates current-voltage characteristics of an IGBT.
Figure 22B:
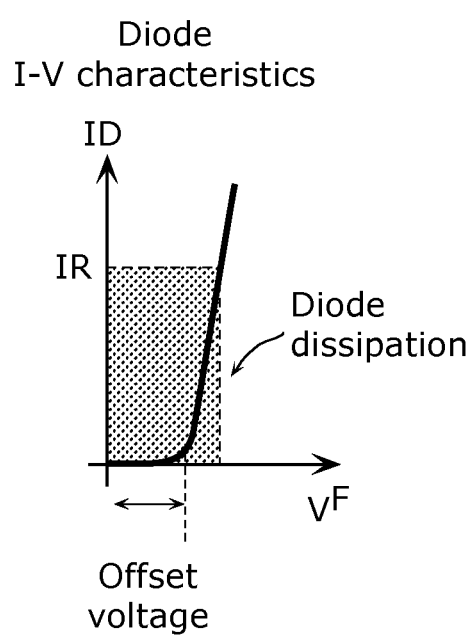
FIG. 22B is a diagram which illustrates current-voltage characteristics of a diode.

The current-voltage characteristics illustrated in FIG. 2A and FIG. 2B are similar to the characteristics of a metal-oxide semiconductor field-effect transistor (MOSFET). Particularly, the current-voltage characteristics illustrated in FIG. 2B are referred to as inverse FET characteristics. As can be seen from these diagrams, the switching element 105 does not have an offset voltage due to a pn-junction as in the current-voltage characteristics of the IGBT illustrated in FIG. 22A.

In addition, FIG. 2C is a diagram which illustrates a relationship between the voltage VDS and the current IDS when the voltage Vgs is smaller than or equal to the threshold voltage Vth. As illustrated in FIG. 2C, the current flowing from the drain terminal to the source terminal is interrupted when the voltage Vgs is smaller than or equal to the threshold voltage Vth. In addition, the switching element 105 has characteristics of being capable of passing a current from the source terminal to the drain terminal when the gate terminal voltage with reference to the drain terminal voltage is greater than or equal to the threshold voltage. The characteristics are called inverse conductive characteristics.

As described above, the switching element 105 is a bidirectional switching element capable of passing a current bi-directionally and not having an offset voltage in the current-voltage characteristics unlike IGBTs.

In addition, the AC switches 104 each include two switching elements 105A and 105B as illustrated in FIG. 1. It is to be noted that, when the two switching elements 105A and 105B are not particularly discriminated, they are denoted as the switching elements 105.

The drain terminals of the two switching elements 105A and 105B are connected to each other. In addition, the source terminal of the switching element 105B is connected to the output terminal 102, and the source terminal of the switching element 105A is connected to a corresponding one of the AC input terminals 101. In other words, the two switching elements 105A and 105B are connected in series.

The gate signal input terminals 103 are supplied with six gate signals from outside.

The level-shift circuit 107 transmits the six gate signals provided to the gate signal input terminals 103 to the six pre-drive circuits 106. The level-shift circuit 107 may change a voltage level of the six gate signals provided to the gate signal input terminals 103 and transmit the six gate signals of which the voltage level is changed to the six pre-drive circuits 106.

Each of the six pre-drive circuits 106 is provided for a corresponding one of the six gate signals transmitted by the level-shift circuit 107 and a corresponding one of the six switching elements 105. Each of the pre-drive circuits 106 supplies a voltage between the source terminal and the gate terminal of a corresponding one of the switching elements 105 according to the corresponding gate signal transmitted by the level-shift circuit 107.

Prior to describing an operation of the direct conversion circuit 100, how a single one of the AC switches 104 operates will be described, and then how the direct conversion circuit 100 for a single-phase which includes the three AC switches 104 generates a single AC current from a three-phase AC power through switching operation will be described.

Figure 3A:
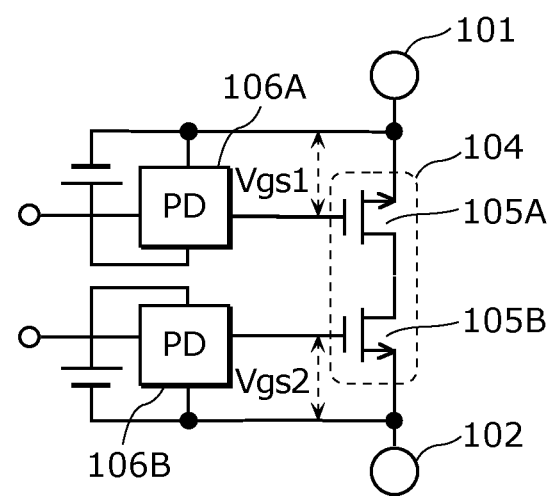
FIG. 3A is a diagram which illustrates a configuration of the AC switch according to Embodiment 1 of the present disclosure.

FIG. 3A is a diagram which illustrates one of the AC switches 104 and a driving circuit thereof. In addition, in FIG. 3A, two of the pre-drive circuits 106 corresponding to the AC switch 104 are denoted as pre-drive circuits 106A and 106B.

The pre-drive circuit 106A supplies a gate voltage Vgs 1 between the gate terminal and the source terminal of the switching element 105A. The pre-drive circuit 106B supplies a gate voltage Vgs 2 between the gate terminal and the source terminal of the switching element 10513. More specifically, the pre-drive circuits 106A and 106B supply voltage Vg that is 0V or greater than or equal to the threshold voltage Vth of the switching element 105, as the gate voltage Vgs 1 or Vgs 2.

Figure 3B:
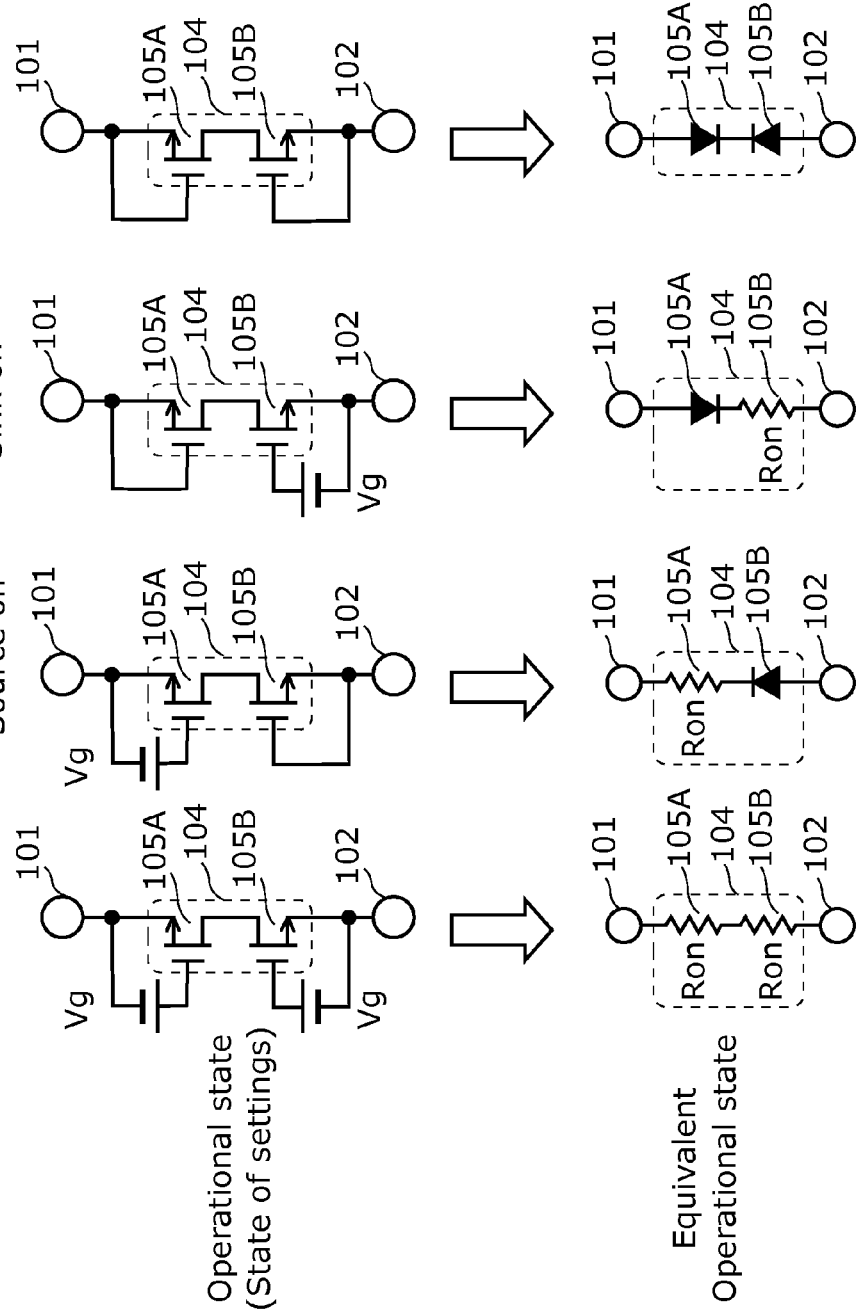
FIG. 3B is a diagram which illustrates an operational state of the AC switch according to Embodiment 1 of the present disclosure.

FIG. 3B is a diagram illustrating operation modes of the AC switch 104. The AC switch 104 has four operation modes illustrated in (a) to (d) in FIG. 3B. In each of (a) to (d), an operational state (state of settings) of the AC switch 104 is shown in the upper side, and an equivalent operational state of the AC switch 104 is shown in the lower side.

In (a) in FIG. 3B, the operational state in the case where the voltage Vg is supplied to both of the switching elements 105A and 105B, as the voltage Vgs 1 and Vgs 2 is illustrated. In this case, the switching elements 105A and 105B operate with the current-voltage characteristics illustrated in FIG. 2A, FIG. 2B, and FIG. 2C. More specifically, the switching elements 105A and 105B operate in a so-called triode region in the MOSFET and the like. In this case, the AC switch 104 is equivalent to two resistances each having a resistance value Ron connected in series. This equivalent operational state is called a conducting mode.

In (b) in FIG. 3B, the operational state in the case where the voltage Vg is supplied to the switching element 105A as the voltage Vgs 1, and 0V is supplied to the switching element 105B as the voltage Vgs 2 is illustrated. The switching element 105A to which the voltage Vg is supplied is equivalent to a resistance having a resistance value Ron. In addition, the switching element 105B to which 0V is supplied is equivalent to a diode having the gate terminal and the source terminal as anodes and the drain terminal as a cathode, as can be seen from FIG. 2C. This diode representation means that the switching element 105 to which 0V is provided between the gate terminal and the source terminal passes through a current only in the direction from the source terminal to the drain terminal.

The state in which a current flows from the output terminal 102 to the AC input terminal 101 as in (b) in FIG. 3B is called an inverse conducting mode 1 or a Source off mode. It is called the Source off because the state where a current is ejected from the AC input terminal 101 to the output terminal 102 is stopped.

In addition, the state in which a current flows from the AC input terminal 101 to the output terminal 102 as in (c) in FIG. 3B is called an inverse conducting mode 2 or a Sink off mode. It is called the Sink off because the state where a current is pulled from the output terminal 102 to the AC input terminal 101 is stopped.

In (d) in FIG. 3B, the operational state is shown in the case where 0V is supplied to both of the switching elements 105A and 105B, as the voltage Vgs 1 and Vgs 2. In this case, the switching elements 105A and 105B are equivalent to a circuit in which two diodes are connected to be oriented oppositely between the AC input terminal 101 and the output terminal 102. As can be seen from the equivalent operational state, there is no conductive characteristics between the AC input terminal 101 and the output terminal 102. This state is called a off mode.

The following describes how the direct conversion circuit 100 for a single-phase including the three AC switches 104 generates a single-phase AC signal from a three-phase AC signal through a switching operation, with reference to FIG. 4A to FIG. 4H.

Figure 4A:
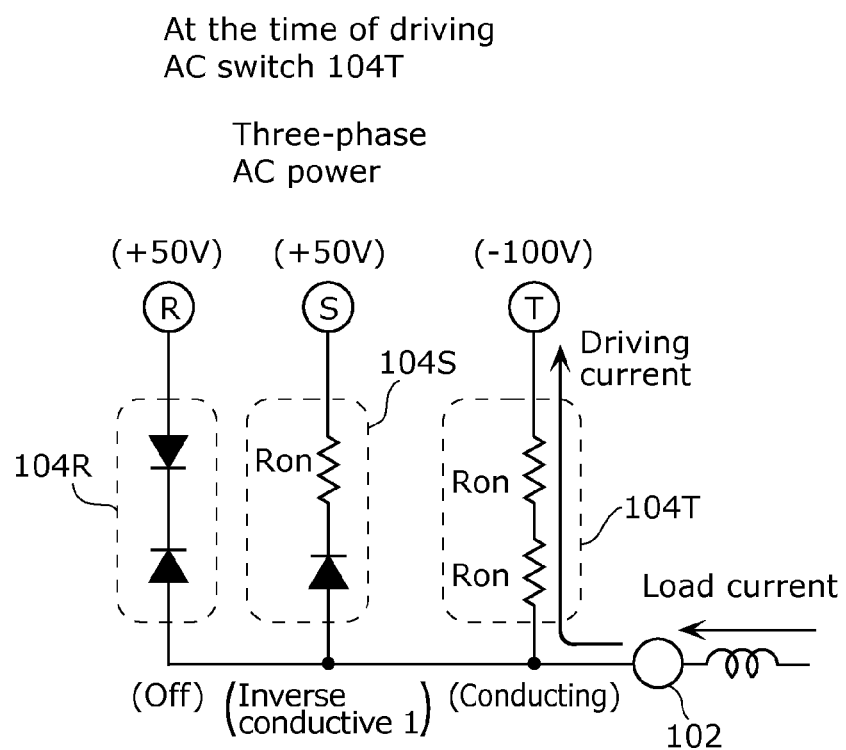
FIG. 4A is a diagram which illustrates an operational state of a direct conversion circuit according to Embodiment 1 of the present disclosure.
Figure 4B:
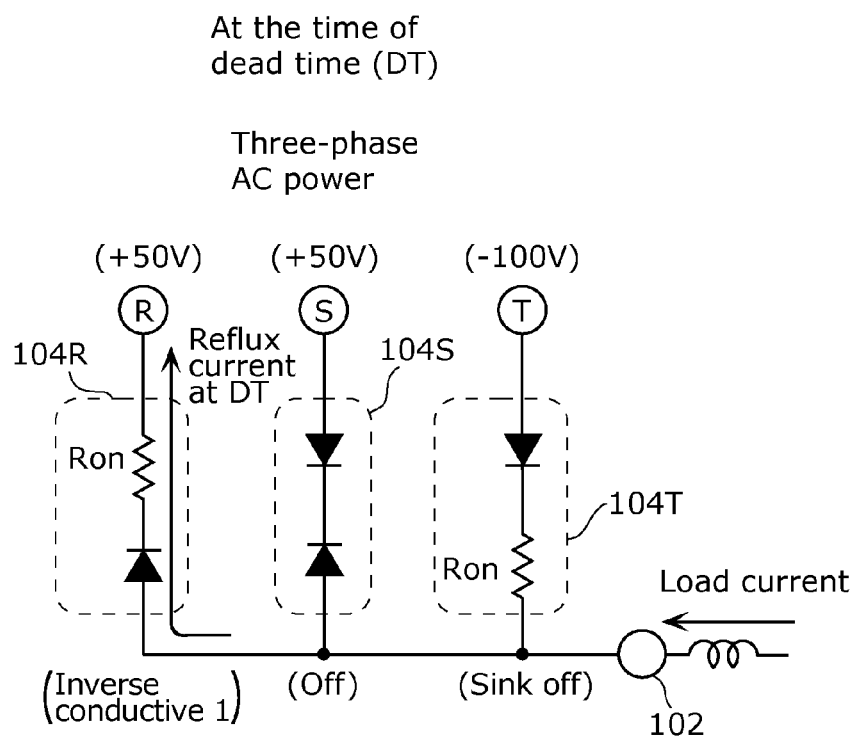
FIG. 4B is a diagram which illustrates an operational state of the direct conversion circuit according to Embodiment 1 of the present disclosure.

FIG. 4A to FIG. 4B are diagrams which illustrate examples explaining how a current consecutively flows from the three-phase AC power which is provided to the three AC input terminals 101 to the output terminal 102, by replacing the three AC switches 104 with the AC switches 104 in the equivalent operational state illustrated in the lower side of FIG. 3B. These illustrations explain only a part of the operation. However, the method of extracting an AC signal of an arbitrary frequency from a three-phase AC power performed by the matrix converter is based on and simply applies the operation explained here.

Prior to describing a series of operations of three AC switches 104 of the direct conversion circuit 100 for a single phase with reference to FIG. 4A to FIG. 4H, the following describes (i) external conditions posed on the direct conversion circuit 100, and (ii) an operation required to the direct conversion circuit 100 by the matrix converter control unit corresponding to the direct conversion circuit 100. It is to be noted that, although the external conditions described below are proper for explaining the operations, they are not necessarily match the operations in actual use.

A three-phase AC signal is applied to each of the AC input terminals 101 in the direct conversion circuit 100. It is assumed that +50 V is applied to both of the AC input terminal 101R (hereinafter referred to also as a terminal R) and the AC input terminal 101S (hereinafter referred to also as a terminal S), and −100 V is applied to the AC input terminal 101T (hereinafter referred to also as a terminal T) during a certain period. It is also assumed that, as a state where the matrix converter drives a load, the output terminal 102 of the direct conversion circuit 100 pulls a load current. It is further assumed that, since the load is an inductive load, the load current is temporally consecutively pulled by the output terminal 102. In this case, the matrix converter control unit performs drive control on the direct conversion circuit 100 such that a load current is pulled (i) as a driving current from the AC power of −100 V at the terminal T, and (ii) as a reflux current from each of the AC powers of +50 V at the terminal R and the terminal S alternately. Why such a drive control is performed will be explained in another embodiment described below.

The driving current and the reflux current are technical terms used in the operational description when an inverter of PWM (pulse width modulation) drives an inductive load. To cause a load current to have a given current value, the load is inserted between two power sources, through connection between the load and a switching element group of the inverter during a certain period in a switching cycle of the PWM driving. At this time, the load current flowing through the load increases. The load current at this time is called a driving current.

In addition, to perform control on the load current to have a constant value, it is necessary to reduce the load current by short-circuiting the ends of the load to one of the two power sources through another connection between the load and the switching element group of the inverter during the rest of the switching cycle of the PWM driving. The load current flowing through the load in this state is called the reflux current.

In the inverter of the PWM driving, the PWM control is performed on a duty ratio of a period in which the load current is the driving current and a period in which the load current is the reflux current, thereby controlling the load current. In the matrix converter as well, it is possible to control a current value of the load current over time by performing the PWM control. With this, it is possible to supply a load with power having an arbitrary frequency and magnitude.

To more clarify the operation for a stable operation of the load driving operation performed by the matrix converter control unit on the direct conversion circuit described above, the switching operation described below is required for the direct conversion circuit 100.

(1) The terminal T and the output terminal 102 are connected so as to increase the load current, and a driving current is provided into the AC power (−100 V) at the terminal T.

(2) The load current is changed from a driving current state to a reflux current state by changing the flow of the load current from the AC power (−100 V) at the terminal T to the AC power (+50 V) at the terminal R. With this, the load current value is controlled (the load current decreases in the reflux current state).

(3) The terminal T and the output terminal 102 are connected so as to increase once again the load current, and a driving current is provided into the AC power (−100 V) at the terminal T.

(4) The load current is changed from the driving current state to the reflux current state by changing the flow of the load current from the AC power (−100 V) at the terminal T to the AC power (+50 V) at the terminal S. This enables controlling of the load current value.

(5) The load current value is controlled by setting the above-described states (1) to (4) for a certain period of time, and causing the load current to repeatedly transit between the driving current state and the reflux current state, thereby controlling the load current value.

(6) Since the load is the inductive load in the controlling of the load current of the above-described (5), it is required for the direct conversion circuit 100 to perform a switching operation so that the load current maintains a consecutive current.

(7) It is required that there is not, even for a moment, a mode in which the AC power for each of the phases of the terminal R, the terminal S, and the terminal T can passes a current bi-directionally via the direct conversion circuit 100 in the switching operation of the direct conversion circuit 100, that is, a mode in which there is a short circuit between the AC powers.

The following describes that the operations of the direct conversion circuit 100 illustrated in FIG. 4A to FIG. 4H satisfy the above-described required switching operation. In other words, the following describes that the direct conversion circuit 100 operates sufficiently as a direct conversion circuit of a matrix converter.

In FIG. 4A, the AC switch 104T is in the conducting mode, and the terminal T and the output terminal 102 are connected with low resistivity. With this, the load current is provided as a driving current into the AC power (−100 V) at the terminal T, thereby increasing the load current. This state is called drive state caused by the AC switch 104T.

Figure 4C:
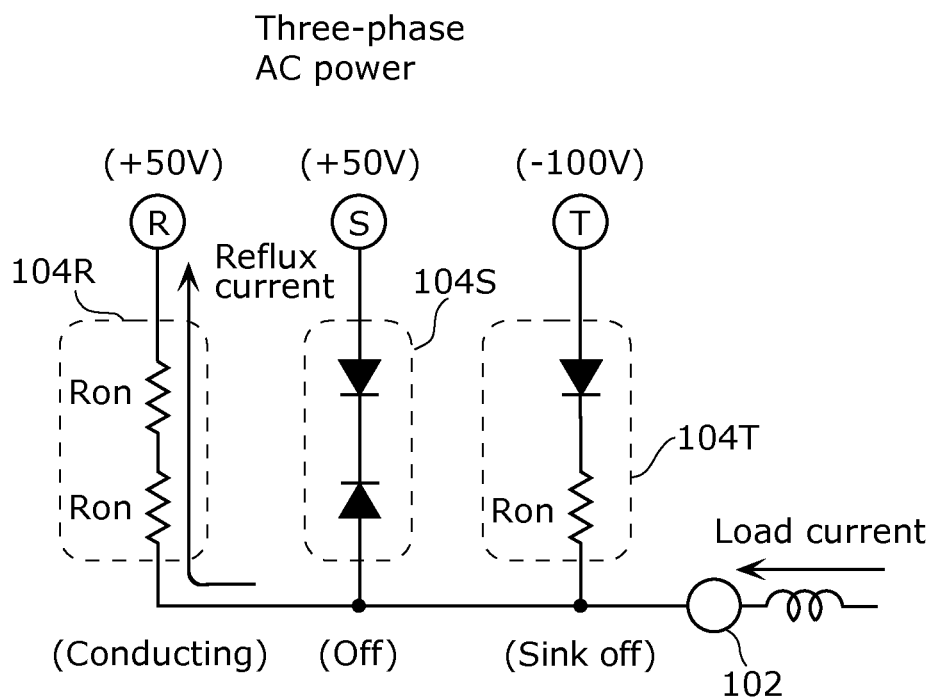
FIG. 4C is a diagram which illustrates an operational state of the direct conversion circuit according to Embodiment 1 of the present disclosure.

FIG. 4B and FIG. 4C are diagrams which illustrate the state when the load current is provided as a reflux current into the AC power (+50 V) at the terminal R. In FIG. 4C, the AC switch 104R is in the conducting mode, and the terminal T and the output terminal 102 are connected with low resistivity. With this, the load current is provided as a reflux current into the AC power (+50 V) at the terminal R. This state is called a synchronous rectification state caused by the AC switch 104R.

FIG. 4B illustrates an intermediate state when a connection destination of the output terminal 102 connected to the inductive load is changed from the terminal T to the terminal R. In this state, the AC power (+50 V) of the terminal R and the AC power (−100 V) of the terminal T are connected via two diodes of the inverse conducting mode. As to the orientations of the diodes, each of the diodes has an anode connected to the AC power of −100 V at the terminal T and a cathode connected to the AC power of +50 V at the terminal R. Accordingly, when the reverse breakdown voltage of the diodes are sufficient with respect to the voltage difference between the AC powers, the terminal R and the terminal T are in an insulating state. In addition, the terminal S is also insulated from the output terminal 102, the terminal R, and the terminal T due to the orientation of the diode as illustrated. In addition, the load current flows through the inductive load, and thus the load current is a consecutive current. In addition, in FIG. 4B, the switching element 105B of the AC switch 104R between the output terminal 102 and the terminal R is turned off and in the inverse conducting mode 1. With this, the load current is drawn into the AC power (+50 V) at the terminal R from the output terminal 102 as a reflux current due to the effect of the inductive load. As described above, it is possible to change the load current from the driving current to the reflux current without short-circuiting of the AC power (−100 V) at the terminal T and the AC power (+50 V) at the terminal R.

Here, a method is employed which causes the switching elements of an upper arm and a lower arm which drive the same output terminal in an inverter to be turned off simultaneously for avoiding the state where a large current flows from the power (+) to the power (−) of the inverter by simultaneously turning on the switching elements of the upper arm and the lower arm. The period in which the switching elements of the upper arm and the lower arm are simultaneously turned off is called a dead time period. The state illustrated in FIG. 4B is equivalent to the dead time period. Therefore, the reflux current in FIG. 4B is called a reflux current on dead time (on DT).

In addition, the load current value has decreased because the load current is in the reflux current state in FIG. 4B and FIG. 4C, however, it is necessary to increase the load current value by changing again the load current into the driving current state in order to perform control on the load current value to have a constant value. To do so, the output terminal 102 connected to the terminal R via the AC switch 104R is connected again to the terminal T via the AC switch 104T. With this, the load current of the inductive load is drawn into the AC power (−100 V) at the terminal T from the output terminal 102 as a driving current.

Figure 4D:
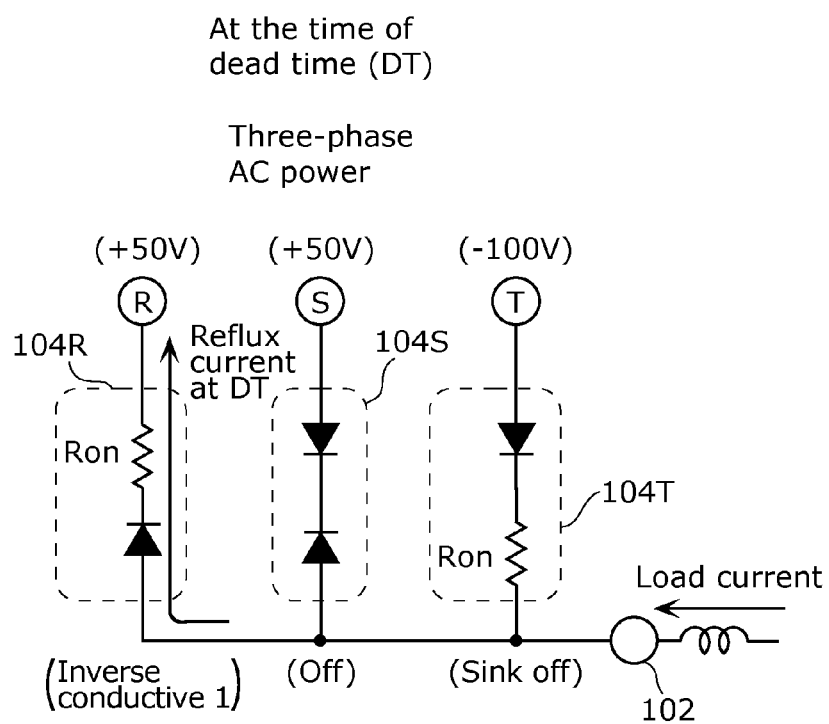
FIG. 4D is a diagram which illustrates an operational state of the direct conversion circuit according to Embodiment 1 of the present disclosure.
Figure 4E:
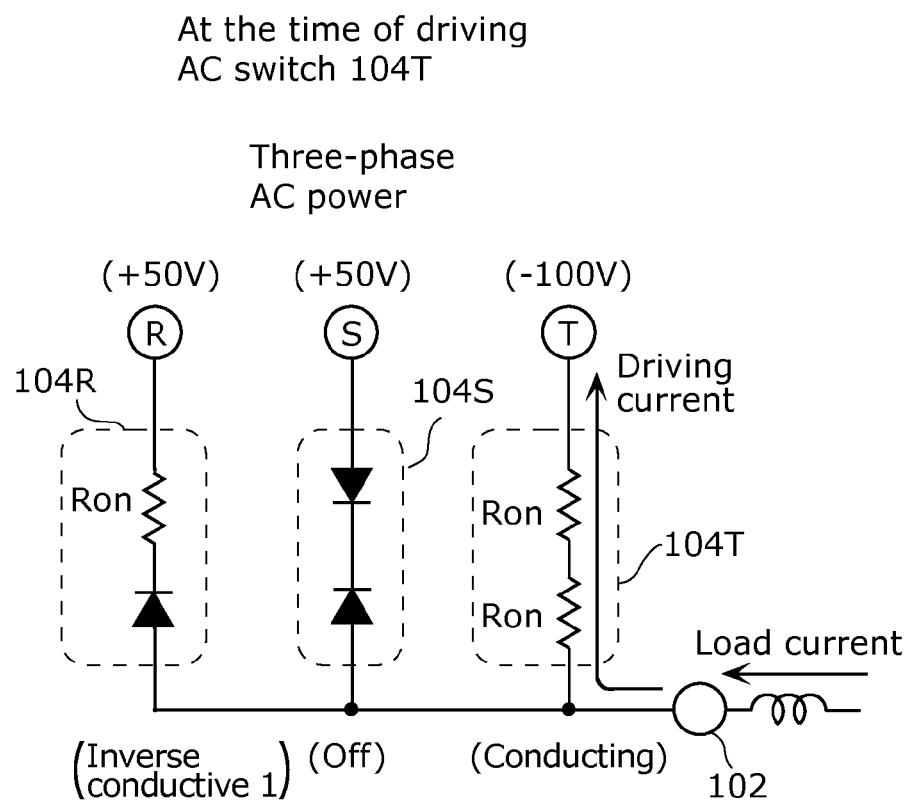
FIG. 4E is a diagram which illustrates an operational state of the direct conversion circuit according to Embodiment 1 of the present disclosure.

FIG. 4E is a diagram which illustrates the state. In FIG. 4E, the AC switch 104T is in the conducting mode, and the output terminal 102 and the terminal T are connected in the low resistance state via the AC switch 104T. As described above, the state returns to the drive state caused by the AC switch 104T described above.

FIG. 4D is a diagram which illustrates the state in transition of the state from FIG. 4C to FIG. 4E. More specifically, the state in FIG. 4D illustrates an intermediate state when a connection destination of the output terminal 102 connected to the inductive load is changed from the terminal R to the terminal T. This state is equivalent to the state in FIG. 4B, and the terminal R and the terminal T are in the insulating state. In addition, the terminal S is also insulated from the other terminals. In addition, in FIG. 4D, the switching element 105B of the AC switch 104R is turned off to be in the inverse conducting mode 1. In addition, since the load current flows in the inductive load and thus becomes a consecutive current, the load current is drawn into the AC power (+50 V) at the terminal R from the output terminal 102 as a reflux current. As described above, it is possible to change the load current from the reflux current to the driving current without short-circuiting of the AC power (+50 V) at the terminal R and the AC power (−100 V) at the terminal T.

In addition, the load current value has increased because the load current is in the driving current state in FIG. 4E, however, it is necessary to decrease the load current value by changing again the load current into the reflux current state in order to perform control on the load current value to have a constant value. To do so, the output terminal 102 connected to the terminal T via the AC switch 104T is connected again to the terminal S via the AC switch 104S. With this, the load current of the inductive load is drawn into the AC power (+50 V) at the terminal S from the output terminal 102 as a reflux current.

Figure 4F:
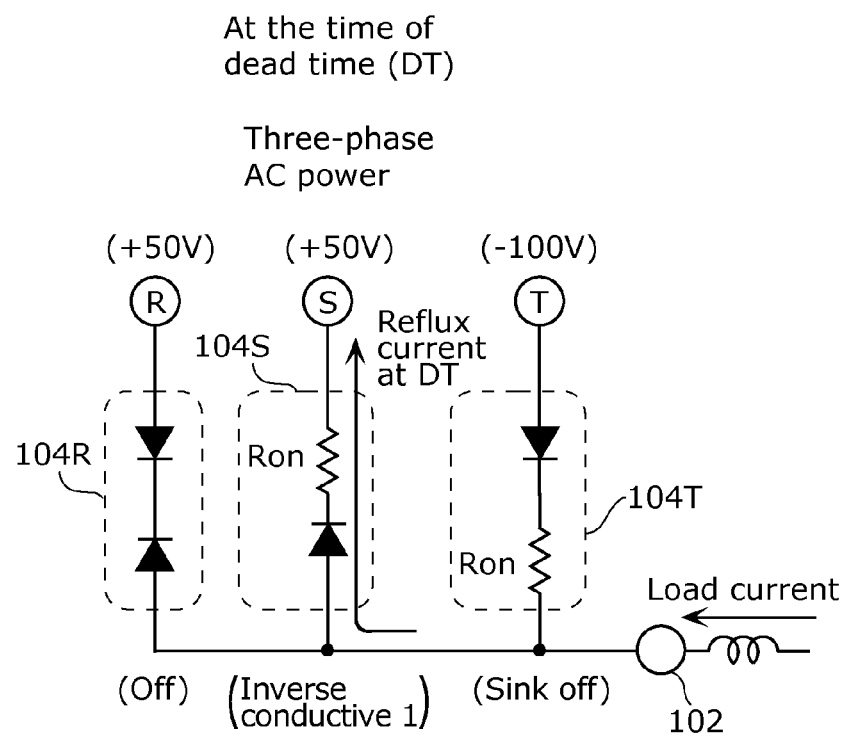
FIG. 4F is a diagram which illustrates an operational state of the direct conversion circuit according to Embodiment 1 of the present disclosure.
Figure 4G:
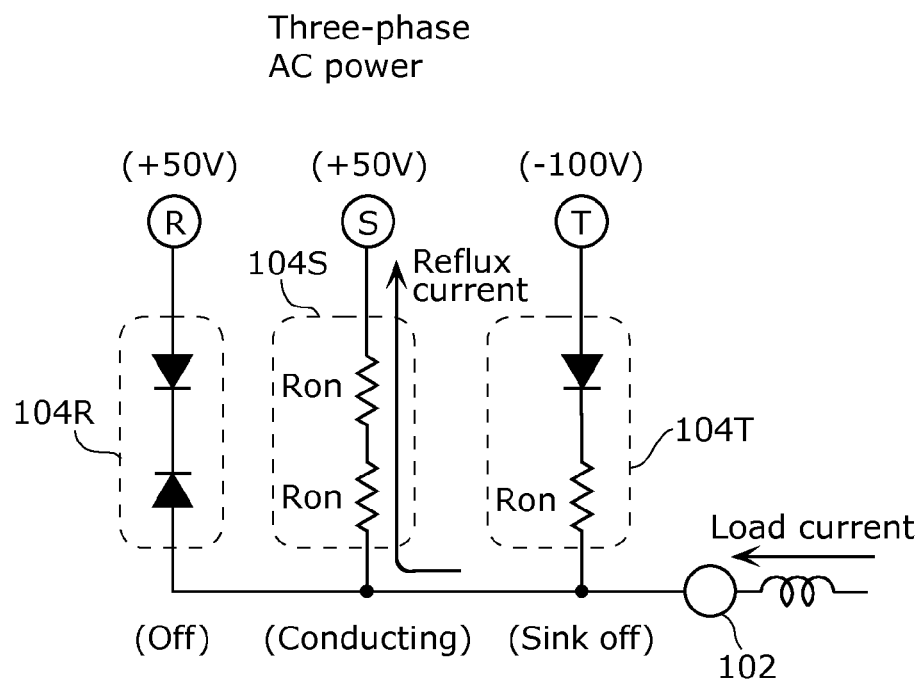
FIG. 4G is a diagram which illustrates an operational state of the direct conversion circuit according to Embodiment 1 of the present disclosure.

FIG. 4G is a diagram which illustrates the state. In FIG. 4G, the AC switch 104S is in the conducting mode, and the output terminal 102 and the terminal T are connected in the low resistance state via the AC switch 104S. This state is called a synchronous rectification state caused by the AC switch 104S.

FIG. 4F is a diagram which illustrates the state in transition of the state from FIG. 4E to FIG. 4G. More specifically, the state in FIG. 4G illustrates an intermediate state when a connection destination of the output terminal 102 connected to the inductive load is changed from the terminal T to the terminal S. Since the state is similar to the state illustrated in FIG. 4B or FIG. 4D, detailed explanation is omitted and only the result is stated. In this state, the terminal T and the terminal S are in the insulating state, and the terminal R is insulated from the other terminals. In addition, the switching element 105B of the AC switch 104S between the output terminal 102 and the terminal S is turned off and put into the inverse conducting mode 1. In addition, the load current flows through the inductive load, and thus the load current is a consecutive current. With this, the load current is drawn into the AC power (+50 V) at the terminal S from the output terminal 102 as a reflux current on dead time (on DT). As described above, it is possible to change the load current from the driving current to the reflux current without short-circuiting of the AC power (−100 V) at the terminal T and the AC power (+50 V) at the terminal S.

In addition, the load current value has decreased because the load current is in the reflux current state in FIG. 4G, however, it is necessary to increase the load current value by changing again the load current into the driving current state in order to perform control on the load current value to have a constant value. As the external conditions posed on the direct conversion circuit 100 for explaining this, the terminal R and the terminal S are applied with +50 V for a certain period of time and the terminal T is applied with −100 V. In the case where this state continues, the state returns again from the synchronous rectification state caused by the AC switch 104S illustrated in FIG. 4G to the drive state caused by the AC switch 104T illustrated in FIG. 4A.

Figure 4H:
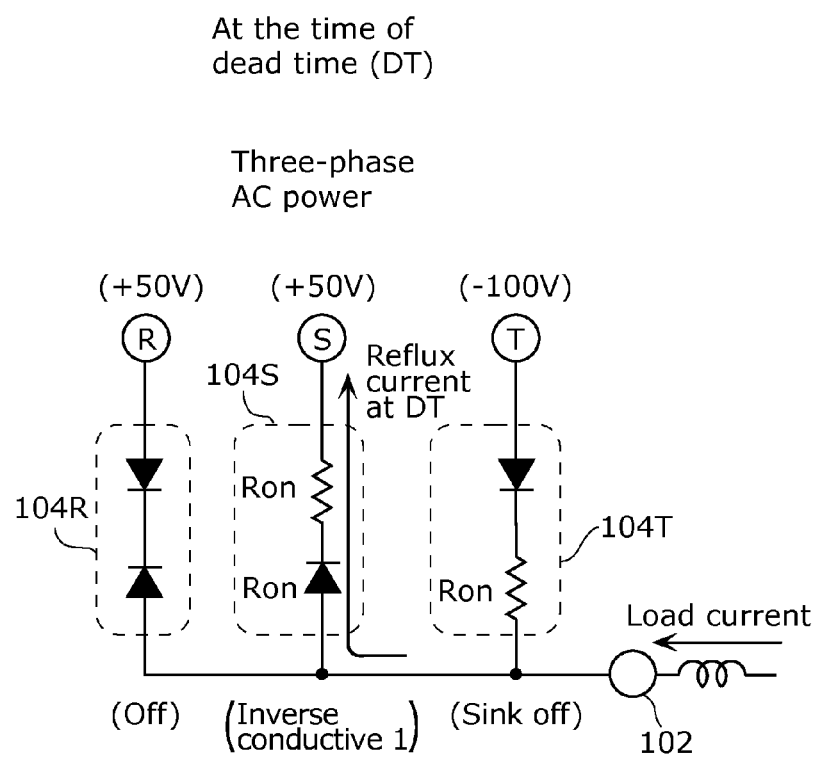
FIG. 4H is a diagram which illustrates an operational state of the direct conversion circuit according to Embodiment 1 of the present disclosure.

FIG. 4H is a diagram which illustrates the state in transition of the state from FIG. 4G to FIG. 4A. More specifically, the state in FIG. 4H illustrates an intermediate state when a connection destination of the output terminal 102 connected to the inductive load is changed from the terminal S to the terminal T. This state is equivalent to the state in FIG. 4F, and the terminal S and the terminal T are in the insulating state. In addition, the terminal R is insulated from the other terminals. In addition, the switching element 105B of the AC switch 104S between the output terminal 102 and the terminal S is turned off and in the inverse conducting mode 1 in FIG. 4H. In addition, the load current flows through the inductive load, and thus the load current is a consecutive current. With this, the load current is drawn into the AC power (+50 V) at the terminal S from the output terminal 102 as a reflux current on dead time (on DT). As described above, it is possible to change the load current from the reflux current to the driving current without short-circuiting of the AC power (+50 V) at the terminal S and the AC power (−100 V) at the terminal T.

In addition, the above-described external conditions posed on the direct conversion circuit 100 are related to the AC power, and the conditions change from moment to moment over time. Thus, the terminal R and the terminal S are applied with +50 V for a certain period of time and the terminal T is applied with −100 V. When this state changes into a different state, the load current in FIG. 4G does not return to the drive status caused by the AC switch 104T in FIG. 4A from the reflux current state, and is in a different drive state according to the change in the state. Accordingly, when the external conditions of the direct conversion circuit 100 change, the switching operations subsequent to FIG. 4G in FIG. 4A to FIG. 4H change into a different switching operational state corresponding to FIG. 4H to FIG. 4G via FIG. 4A.

In this different switching operations as well, the switching operations of the direct conversion circuit 100 are basically the same as those described in FIG. 4A to FIG. 4H other than that just the order of the switching operations of the AC switch 104 changes. Thus, Embodiment 1 of the present disclosure has described that the direct conversion circuit 100 is sufficiently practical as a direct conversion circuit of a matrix converter.

As described above, the switching element 105 used as the AC switch 104 does not have an offset voltage due to the pn-junction as in the IGBT in the drain-source voltage when a current is passed between the drain terminal and the source terminal. With this, it is possible to reduce conduction loss in the switching element 105 compared to the IGBT. It is therefore possible to reduce the conduction loss in the direct conversion circuit 100 that includes the AC switch 104, compared to the direct conversion circuit that includes the IGBT. In addition, due to the inverse conductive characteristics held by the switching element 105 illustrated in FIG. 2C, the AC switch 104 has a configuration in which a diode in not included. Accordingly, the direct conversion circuit 100 including the AC switch 104 does not have an offset voltage due to the pn-junction which is caused by a diode, and thus it is possible to eliminate the conduction loss caused by this. In addition, with the direct conversion circuit 100, it is possible to implement both elimination of the effect of the switching loss caused by a recovery current of the diode, and reduction in the number of components, the costs, and the size because the diode is reduced.

Figure 5A:
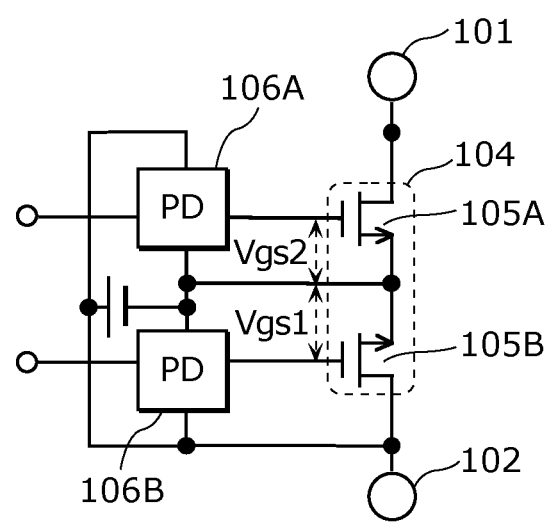
FIG. 5A is a diagram which illustrates a configuration of a modification of the AC switch according to Embodiment 1 of the present disclosure.

It is to be noted that the configuration illustrated in FIG. 5A may be employed as the AC switch 104 according to Embodiment 1 of the present disclosure. In the AC switch 104 illustrated in FIG. 5A, the switching elements 105A and 105B are connected at their respective source terminals, and a drain terminal of one of the switching elements 105A and 105B is connected to the output terminal 102, and a drain terminal of the other is connected to the AC input terminal 101.

Figure 5B:
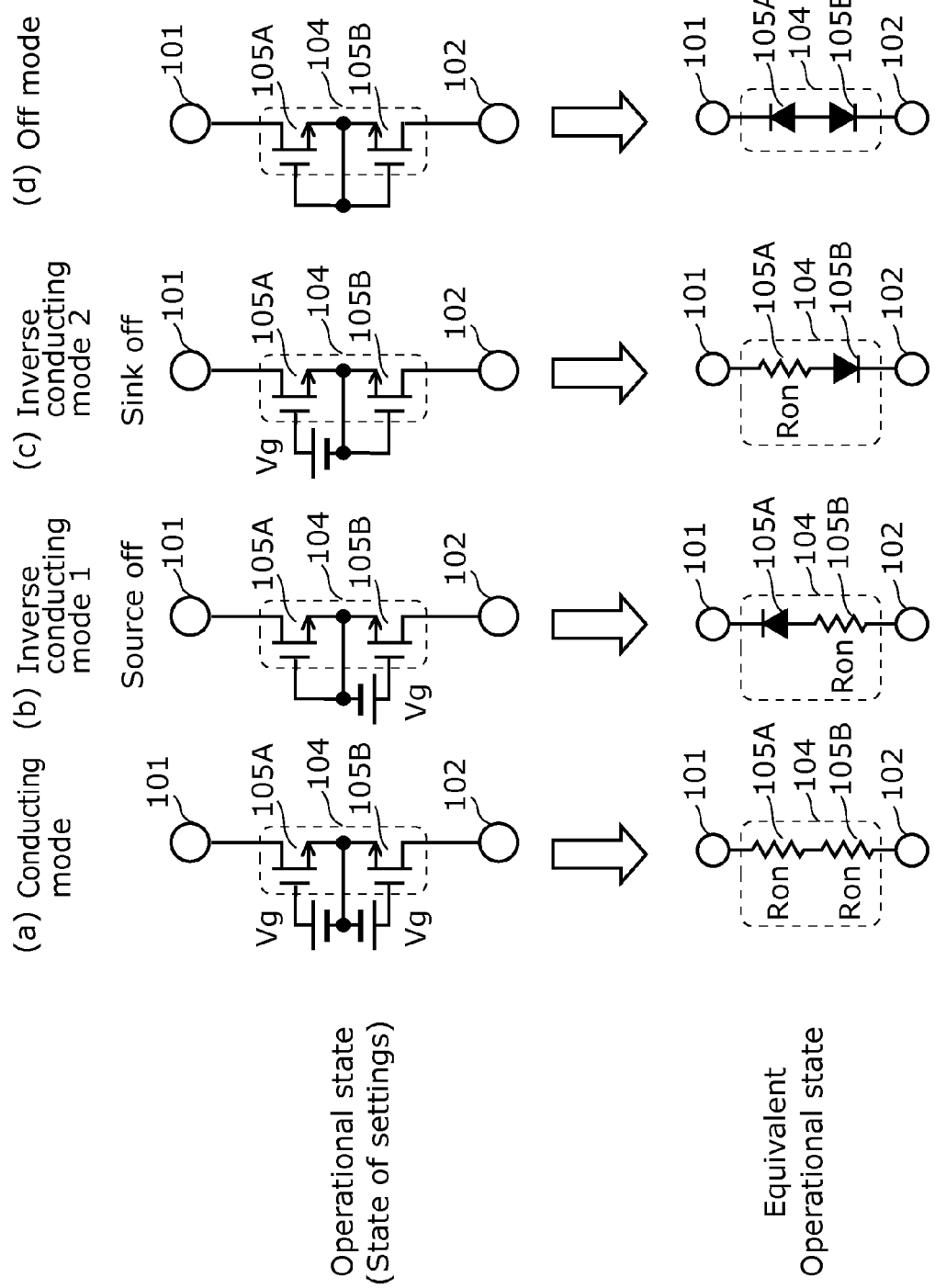
FIG. 5B is a diagram which illustrates an operational state of the AC switch according to Embodiment 1 of the present disclosure.

In addition, FIG. 5B is a diagram illustrating operation modes of the AC switch 104 illustrated in FIG. 5A. As illustrated in FIG. 5B, the AC switch 104 illustrated in 5A is capable of functioning equivalently to the AC switch 104 illustrated in FIG. 3A.

It is to be noted that the switching element 105 may be an existing switching element capable of passing through a current bi-directionally, such as a MOSFET for synchronous rectification. With this configuration as well, the direct conversion circuit 100 according to Embodiment 1 of the present disclosure can operate in principle. In this case as well, the switching element 105 does not have an offset voltage due to the pn-junction as in the IGBT in the drain-source voltage when a current is passed between the drain terminal and the source terminal, and it is therefore possible to reduce the conduction loss due to the switching element 105. However, it should be noted that a parasitic pn-junction diode exists between the source and the drain in such existing devices, leading to switching loss due to the recovery current.

Embodiment 2

In Embodiment 2 of the present disclosure, an example of a specific configuration of the above-described switching element 105 will be described. The switching element 105 according to Embodiment 2 of the present disclosure includes: a semiconductor stacked body including a nitride semiconductor formed on a semiconductor substrate; a drain terminal and a source terminal placed at intervals on the semiconductor stacked body; and a gate terminal formed between the drain terminal and the source terminal. The following describes the switching element 105 with reference to FIG. 6.

Figure 6:
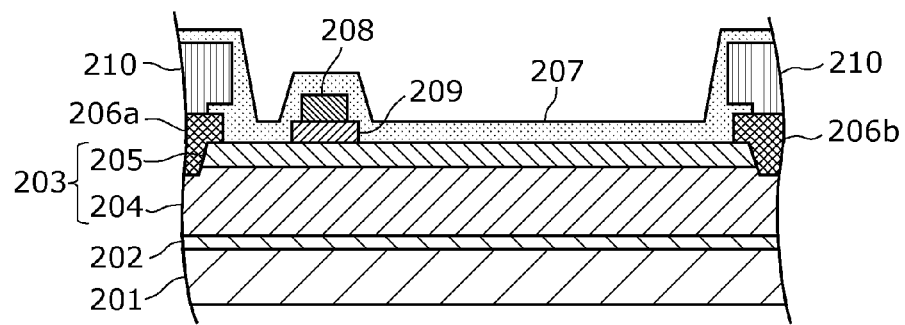
FIG. 6 is a cross-sectional view of a switching element according to Embodiment 2 of the present disclosure.

FIG. 6 is a cross-sectional view of a switching element 105 according to Embodiment 2 of the present disclosure. The switching element 105 illustrated in FIG. 6 is a normally-off heterojunction FET including a nitride semiconductor formed on the semiconductor substrate. The switching element 105 includes: a silicon substrate 201 (semiconductor substrate); a buffer layer 202; a semiconductor stacked body 203; a source electrode 206a; a drain electrode 206b; a protection film 207; a gate electrode 208; a control layer 209; and a line 210. In addition, the semiconductor stacked body 203 includes: an undoped gallium nitride layer 204; and an n-type aluminum gallium nitride layer 205.

The buffer layer 202 is formed on the silicon substrate 201. The buffer layer 202 is a layer including aluminum nitride and gallium nitride stacked alternately.

The semiconductor stacked body 203 is formed on the buffer layer 202. The semiconductor stacked body 203 includes: the undoped gallium nitride layer 204; and the n-type aluminum gallium nitride layer 205. The n-type aluminum gallium nitride layer 205 is formed on the undoped gallium nitride layer 204. A two-dimensional electron gas is generated near a hetero interface between the two layers. With this, carrier concentration increases near the hetero interface. This region is called an FET channel region.

The source electrode 206a is an ohmic electrode for the source terminal, and the drain electrode 206b is an ohmic electrode for the drain terminal. The source electrode 206a and the drain electrode 206b are each formed on the semiconductor stacked body 203, and form an ohmic contact with the channel region. In addition, the source electrode 206a and the drain electrode 206b are connected to the line 210. The source electrode 206a and the drain electrode 206b correspond to the first electrode and the second electrode of the present disclosure, and serve as the above-described source terminal and drain terminal.

The control layer 209 is a p-type semiconductor layer which controls FET characteristics, and formed in a region between the source electrode 206a and the drain electrode 206b on the n-type aluminum gallium nitride layer 205.

The gate electrode 208 is formed on the control layer 209 and forms an ohmic contact with the control layer 209. According to an electric signal provided to the gate electrode 208, a current is controlled which flows from the drain terminal to the source terminal of the normally-off heterojunction FET, that is, the switching element 105. In other words, the gate electrode 208 serves as the above-described gate terminal.

Here, as illustrated in FIG. 6, the distance between the drain electrode 206b and the gate electrode 208 is larger than the distance from the source electrode 206a to the gate electrode 208. This is for the purpose of making the breakdown voltage between the drain terminal and the gate terminal larger than the breakdown voltage between the source terminal and the gate terminal. It is to be noted that, since the above-described PTL 2 describes in detail the method of forming the normally-off heterojunction FET including the nitride semiconductor as described above, further description will be omitted.

The switching element 105 illustrated in FIG. 6 is a device which has a high breakdown voltage as in the IGBT and is capable of performing high current driving. In addition, the switching element 105 does not have an offset voltage due to the pn-junction as in the current-voltage characteristics of the IGBT, and has a feature of passing a current bi-directionally as illustrated in FIG. 2A and FIG. 2B. In addition, the switching element 105 is capable of reducing an On resistance value Ron and substantially reducing the area. Furthermore, the switching element 105 also has the inverse conductive characteristics illustrated in FIG. 2C. In addition to that, the switching element 105 barely has the accumulation effect of a minority carrier, and barely has the tail current effect at the time of turnoff as in the IGBT.

It is therefore possible to significantly reduce the conduction loss in the direct conversion circuit 100 that includes the AC switch 104 using the switching element 105, compared to the direct conversion circuit that includes the IGBT. In addition, since a diode is not included, it is also possible to eliminate the effect of the switching loss due to the recovery current of the diode. In addition, with the direct conversion circuit 100, since the diode is not included, it is possible to implement reduction in the number of components, the costs, and the size. In addition, the direct conversion circuit 100 barely has a tail current at the time of turnoff which is present in the IGBT, and thus it is possible to further reduce the switching loss than the direct conversion circuit including the IGBT, and to perform switching operation at higher speed.

Embodiment 3

In Embodiment 3 of the present disclosure, an example of a specific configuration of the above-described AC switch 104, which is an example different from Embodiment 2 will be described. The AC switch 104 according to Embodiment 3 of the present disclosure includes: a semiconductor stacked body including a nitride semiconductor formed on a semiconductor substrate; a first output terminal and a second output terminal formed at intervals on the semiconductor stacked body; and a first gate terminal and a second gate terminal formed between the first output terminal and the second output terminal. The following describes the AC switch 104 with reference to FIG. 7.

Figure 7:
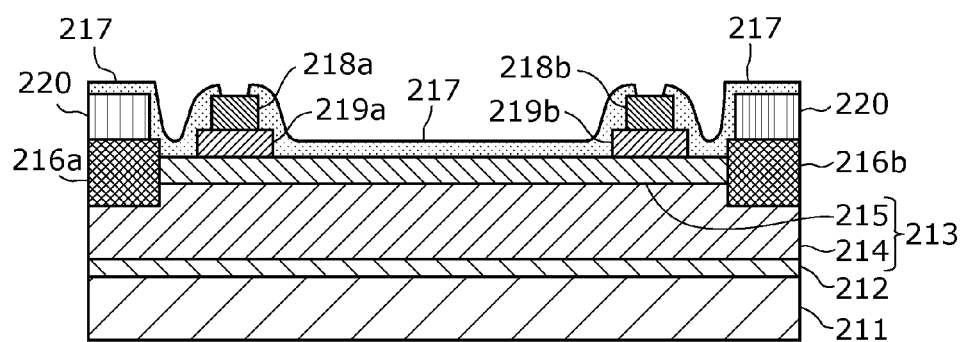
FIG. 7 is a cross-sectional view of an AC switch according to Embodiment 3 of the present disclosure.

FIG. 7 is a cross-sectional view of the AC switch 104 according to Embodiment 3 of the present disclosure. The AC switch 104 includes two normally-off heterojunction FETs illustrated in FIG. 6 which are disposed in series and share the channel region of the drain terminal portion therebetween.

The AC switch 104 includes: a silicon substrate 211 (semiconductor substrate); a buffer layer 212; a semiconductor stacked body 213; ohmic electrodes 216a and 216b; a protection film 217; gate electrodes 218a and 218b; control layers 219a and 219b; and a line 220.

The buffer layer 212 is formed on the silicon substrate 211. The buffer layer 212 is a layer including aluminum nitride and gallium nitride stacked alternately.

The semiconductor stacked body 213 is formed on the buffer layer 212. The semiconductor stacked body 213 includes: an undoped gallium nitride layer 214; and the n-type aluminum gallium nitride layer 215. The n-type aluminum gallium nitride layer 215 is formed on the undoped gallium nitride layer 214. A two-dimensional electron gas is generated near a hetero interface between the two layers. With this, carrier concentration increases near the hetero interface. This region is called an FET channel region.

The ohmic electrodes 216a and 216b are formed on the semiconductor stacked body 213. The ohmic electrode 216a is an ohmic electrode for the first source terminal that is the first output terminal. The ohmic electrode 216b is an ohmic electrode for the second source terminal that is the second output terminal. The ohmic electrodes 216a and 216b form an ohmic contact with the channel region. In addition, the ohmic electrodes 216a and 216b are connected to the line 220. The ohmic electrodes 216a and 216b correspond to the first electrode and the second electrode of the present disclosure, and serve as the source terminals for the above-described switching elements 105A and 105B.

The control layers 219a and 219b are formed in a region between the ohmic electrodes 216a and 216b on the n-type aluminum gallium nitride layer 215. The control layers 219a and 219b are p-type semiconductor layers which control the FET characteristics.

The gate electrode 218a is formed on the control layer 219a, and the gate electrode 218b is formed on the control layer 219b. The control layer 219a and the gate electrode 218a form an ohmic contact, and the control layer 219b and the gate electrode 218b form an ohmic contact. The gate electrodes 218a and 218b serve as two gate terminals of the AC switch 104.

As described above, the AC switch 104 includes two normally-off heterojunction FETs disposed in series, which include a single gate terminal and share the channel region of the drain terminal portion therebetween. According to an electric signal provided to the gate electrode 218a, the first normally-off heterojunction FET having the gate electrode 218a controls a current flowing into the source terminal from the drain region shared with the second heterojunction FET. Likewise, according to an electric signal provided to the second gate electrode 218b, the second normally-off heterojunction FET having the gate electrode 218b controls a current flowing into the source terminal from the drain region shared with the first heterojunction FET.

It is to be noted that, in FIG. 7, the distance between the gate electrode 218a and the gate electrode 218b is larger than the distance between the gate electrode 218a and the ohmic electrode 216a and the distance between the gate electrode 218b and the ohmic electrode 216b. This is because the region between the gate electrode 218a and the gate electrode 218b is the drain region shared by two heterojunction FETs connected in series, as described above. More specifically, as described in Embodiment 2, this is because it is required that the breakdown voltage between the drain terminal and the gate terminal is larger than the breakdown voltage between the source terminal and the gate terminal. It is to be noted that, since the above-described PTL 2 describes in detail the method of forming the normally-off heterojunction FET including the nitride semiconductor as described above, further description will be omitted.

The AC switch 104 formed as illustrated in FIG. 7 has the advantageous effect described in Embodiment 2. In addition to that, although two switching elements 105 are necessary according to Embodiment 2, a single switching element is used to configure the AC switch according to Embodiment 3. With this, the number of the switching elements used in the direct conversion circuit 100 is reduced, and thus it is possible to further reduce the size of the direct conversion circuit 100.

In addition, since the drain region is shared in the AC switch 104, it is possible to reduce the size of the AC switch 104 compared to the size of the AC switch 104 when two switching elements 105 are connected in series.

Embodiment 4

Embodiment 4 describes a method of driving the above-described direct conversion circuit 100, and a matrix converter control apparatus which drives the direct conversion circuit 100. More specifically, Embodiment 4 describes a matrix converter control apparatus of three-phase AC to single-phase PWM, which outputs a single-phase PWM signal from a three-phase AC voltage.

Figure 8:
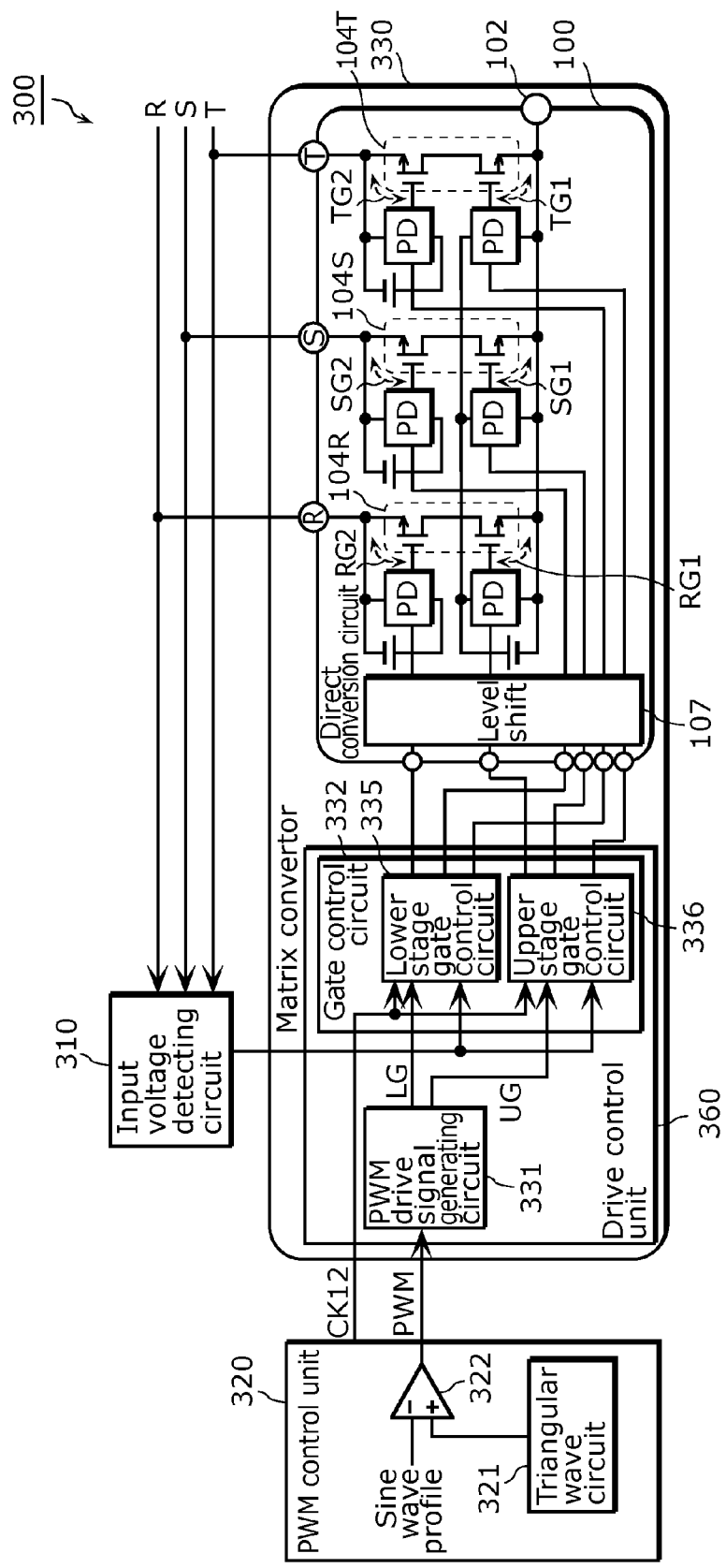
FIG. 8 is a block diagram of the matrix converter control apparatus according to Embodiment 4 of the present disclosure.

FIG. 8 is a block diagram of the matrix converter control apparatus 300 according to Embodiment 4 of the present disclosure.

The matrix converter control apparatus 300 illustrated in FIG. 8 converts a three-phase AC signal using the PWM into a single-phase AC signal. The matrix converter control apparatus 300 includes: an input voltage detecting circuit 310; a PWM control unit 320; and a matrix converter 330 of the three-phase AC to single-phase PWM. In addition, the matrix converter 330 includes a direct conversion circuit 100 and a drive control unit 360.

Here, the input voltage detecting circuit 310, the PWM control unit 320, and the drive control unit 360 correspond to the matrix converter control unit described in Embodiment 1.

The input voltage detecting circuit 310 detects a three-phase AC input voltage supplied to the AC input terminal 101. The input voltage detecting circuit 310 generates a gate control signal for controlling the gate control circuit 332 according to the three-phase AC input voltage. More specifically, the input voltage detecting circuit 310 detects a voltage value of each of the phases of the three-phase AC input signal.

The drive control unit 360 generates six gate signals using the PWM control signal, thereby controlling the direct conversion circuit 100.

More specifically, the drive control unit 360, using the result of detection performed by the input voltage detecting circuit 310, discriminates between a first phase signal which is a signal of a phase in which a voltage has a highest absolute value in the three-phase AC signal, a second phase signal other than the first phase signal in the three-phase AC signal, and a third phase signal other than the first phase signal and the second phase signal in the three-phase AC signal, at predetermined intervals. Then, the drive control unit 360 puts the third AC switch that is the AC switch 104 to which the third phase signal is supplied via the AC input terminal 101, into an interruption state. In addition, the drive control unit 360 generates a single-phase AC signal from the first phase signal and the second phase signal using the first AC switch that is the AC switch 104 to which the first phase signal is supplied via the AC input terminal 101 and the second AC switch that is the AC switch 104 to which the second phase signal is supplied via the AC input terminal 101, and outputs the generated single-phase AC signal to the output terminal 102.

In addition, the drive control unit 360 switches a signal to be determined as the second phase signal between two different phase signals other than the first phase signal, at predetermined intervals.

The drive control unit 360 includes a gate control circuit 332 and a PWM drive signal generating circuit 331.

The PWM control unit 320 generates a PWM control signal "PWM" and a PWM driving timing signal "CK12". The PWM control signal is a signal from which the six gate signals supplied to the direct conversion circuit 100 are generated. The PWM control unit 320 includes a triangular wave circuit 321 which generates a triangular wave, and a comparator 322. The comparator 322 compares the triangular wave generated by the triangular wave circuit 321 and a sine wave profile, thereby generating a PWM control signal.

The PWM drive signal generating circuit 331 generates PWM drive signals "LG" and "UG" using the PWM control signal.

The gate control circuit 332 generates six gate signals according to the PWM drive signals "LG" and "UG", the PWM driving timing signal "CK12", and the gate control signal. The gate control circuit 332 includes a lower stage gate control circuit 335 and upper stage gate control circuit 336. The lower stage gate control circuit 335 generates three gate signals to be supplied to three switching elements 105A according to the PWM drive signal "LG", the PWM driving timing signal "CK12", and the gate control signal. The upper stage gate control circuit 336 generates three gate signals to be supplied to three switching elements 105B according to the PWM drive signal "UG", the PWM driving timing signal "CK12", and the gate control signal.

Figure 9:
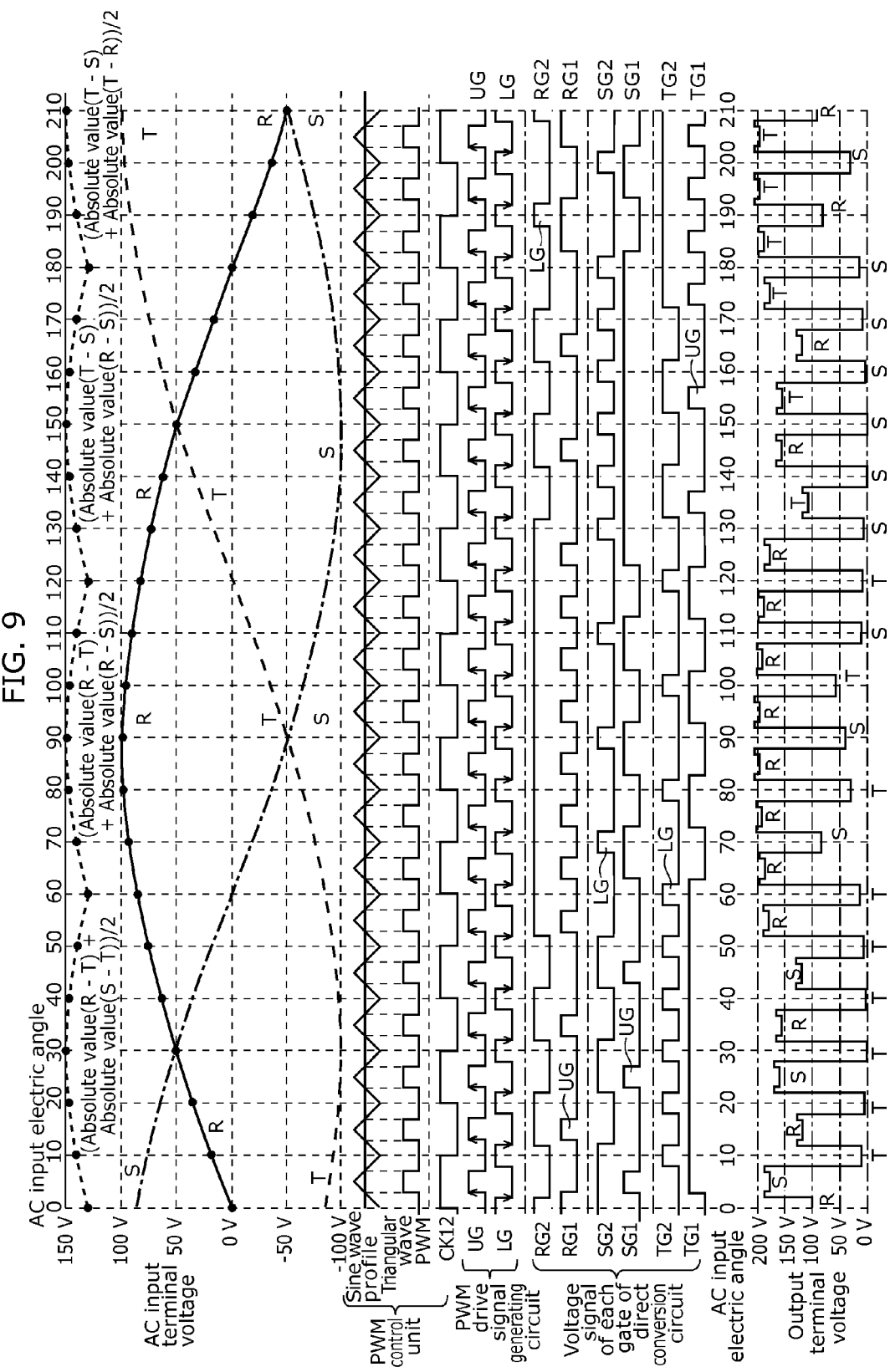
FIG. 9 is a diagram which illustrates a timing waveform at the time when the matrix converter control apparatus operates according to Embodiment 4 of the present disclosure.

FIG. 9 is a diagram which illustrates a timing waveform of the matrix converter control apparatus 300 at the time of operation illustrated in FIG. 8. The following describes the operation of the matrix converter control apparatus 300 with reference to this diagram.

The three-phase AC power is, as the name suggests, an alternate current, and thus the power-supply voltage changes over time. In FIG. 9, the change in the AC power is described not as a temporal change but as a change in an electric angle. In addition, in FIG. 9, the electric angle of the AC input power is shown only from 0 degree to 210 degrees due to limitations of space. However, for explaining the driving method of the matrix converter control apparatus 300, operational description in the section of 30 to 150 degrees in the timing diagram of FIG. 9 is basically sufficient for understanding. The following describes operations in the section of 30 to 150 degrees.

Names of the respective signals in FIG. 9 correspond to the signal names illustrated in FIG. 8. Three sine wave waveforms illustrated on the upper side in FIG. 9 are voltage waveforms of the three-phase AC power provided to a terminal R, a terminal S, and a terminal T. In this illustration, it is assumed that each of the AC power voltages changes in a sine wave form in a range from −100 V to +100 V, and the phase of each of the AC powers is different by 120 degrees. In FIG. 9, the waveform illustrated by a broken line around 150 V above the three phase AC input terminal voltages is a waveform to be used for subsequently describing the controlling method of the matrix converter. This waveform will be explained later there.

The signals "sine wave profile", "triangular wave", "PWM", and "CK12" under the three phase AC input terminal voltages are signals related to the PWM control unit 320 illustrated in FIG. 8.

The "sine wave profile" is, in actual use, a signal for outputting, in a sine wave form, an average value of the PWM output voltages of the output terminal 102 of the matrix converter 330. The PWM signal "PWM" is generated from this signal and the "triangular wave" using the comparator 322. When the "sine wave profile" is set to a sine wave waveform of an arbitrary frequency, the "PWM" becomes a PWM signal having a duty in a sine wave form equivalent to the "sine wave profile". In the description of this embodiment, the "sine wave profile" is assumed to be a DC value so that a duty of the "PWM" is a certain fixed value, for facilitating explanation in FIG. 9. It is to be noted that, in this embodiment, the "sine wave profile" signal and the "triangular wave" signal are introduced to the PWM control unit 320 in order to generate the PWM signal "PWM", however, it is not necessary to do so, and the PWM signal "PWM" may be generated through digital signal processing.

The "CK12" is a PWM driving timing signal generated in the PWM control unit 320 illustrated in FIG. 8. The PWM driving timing signal "CK12" is used in controlling a gate signal generated in the gate control circuit 332. In addition, the PWM driving timing signal "CK12" is output in synchronization with the PWM signal "PWM". The PWM output that is output from the output terminal 102 in the matrix converter control apparatus 300, described further below, is controlled by regarding outputs of two PWM operations as a single PWM output. The "CK12" is a signal that is used for switching between the two PWM operations The "UG" and the "LG" are the PWM drive signals output from the PWM drive signal generating circuit 331 illustrated in FIG. 8, and signals resulting from waveform shaping on the PWM signal "PWM". The "UG" and the "LG" are the PWM signals used also in a general half bridge inverter circuit illustrated in FIG. 11. It is to be noted that description regarding the half bridge inverter circuit will be given later. The "UG" is a drive signal of the switching element of an upper arm of the inverter, and the "LG" is a drive signal of the switching element of a lower arm of the inverter.

The signals "RG2", "RG1", "SG2", "SG1", "TG2", and "TG1" respectively are gate voltage signals (gate-source voltage) of the six switching elements 105 illustrated in FIG. 8. The "RG2", "SG2", and "TG2" are referred to as lower-side gate voltage signals, and the "RG1", "SG1", and "TG1" are referred to as upper-side gate voltage signals, in order to associated them with later description.

The "RG2", "SG2", and "TG2" are signals resulting from waveform shaping performed in the gate control circuit 332 using the above-described "CK12", "LG", and the gate control signals generated in the input voltage detecting circuit 310. The "RG2", "SG2", and "TG2" are waveform-shaped and output at the time of falling edge of the signal "LG".

The "RG1", "SG1", and "TG1" are signals resulting from waveform shaping performed in the gate control circuit 332 using the above-described "CK12", "UG", and the gate control signals generated in the input voltage detecting circuit 310 illustrated in FIG. 8. The "RG1", "SG1", and "TG1" are waveform-shaped and output at the time of rising edge of the signal "UG".

When the gate voltage signals "RG2", "RG1", "SG2", "SG1", "TG2", and "TG1" become as illustrated in FIG. 9, the PWM output voltages provided to the output terminal 102 of the matrix converter 330 show waveforms as "output terminal voltages" illustrated in FIG. 9. In the case of FIG. 9, a load current is set to be drawn into from the output terminal 102 as illustrated in FIG. 4A to FIG. 4H.

In addition, the PWM waveforms of the "output terminal voltages" in FIG. 9 are proper output waveforms of the matrix converter in the state where the "sine wave profile" is set to a DC value. It is possible to set the duty of the "PWM" to a certain fixed value by setting the "sine wave profile" to the DC value. As described above, the matrix converter control apparatus 300 according to the present disclosure performs proper operation control. Incidentally, the operations performed by the direct conversion circuit 100 described in FIG. 4A to FIG. 4H in Embodiment 1 are in the state of the AC input electric angle from 30 degrees to immediately before 50 degrees in FIG. 9. Although the description further veers of, the frequency of the PWM control signal "PWM" is 36 times larger than the frequency of the AC power, for convenience, in FIG. 9. In actual use, the frequency of the "PWM" is generally larger than or equal to 100 times larger than the frequency of the AC power.

Figure 10:
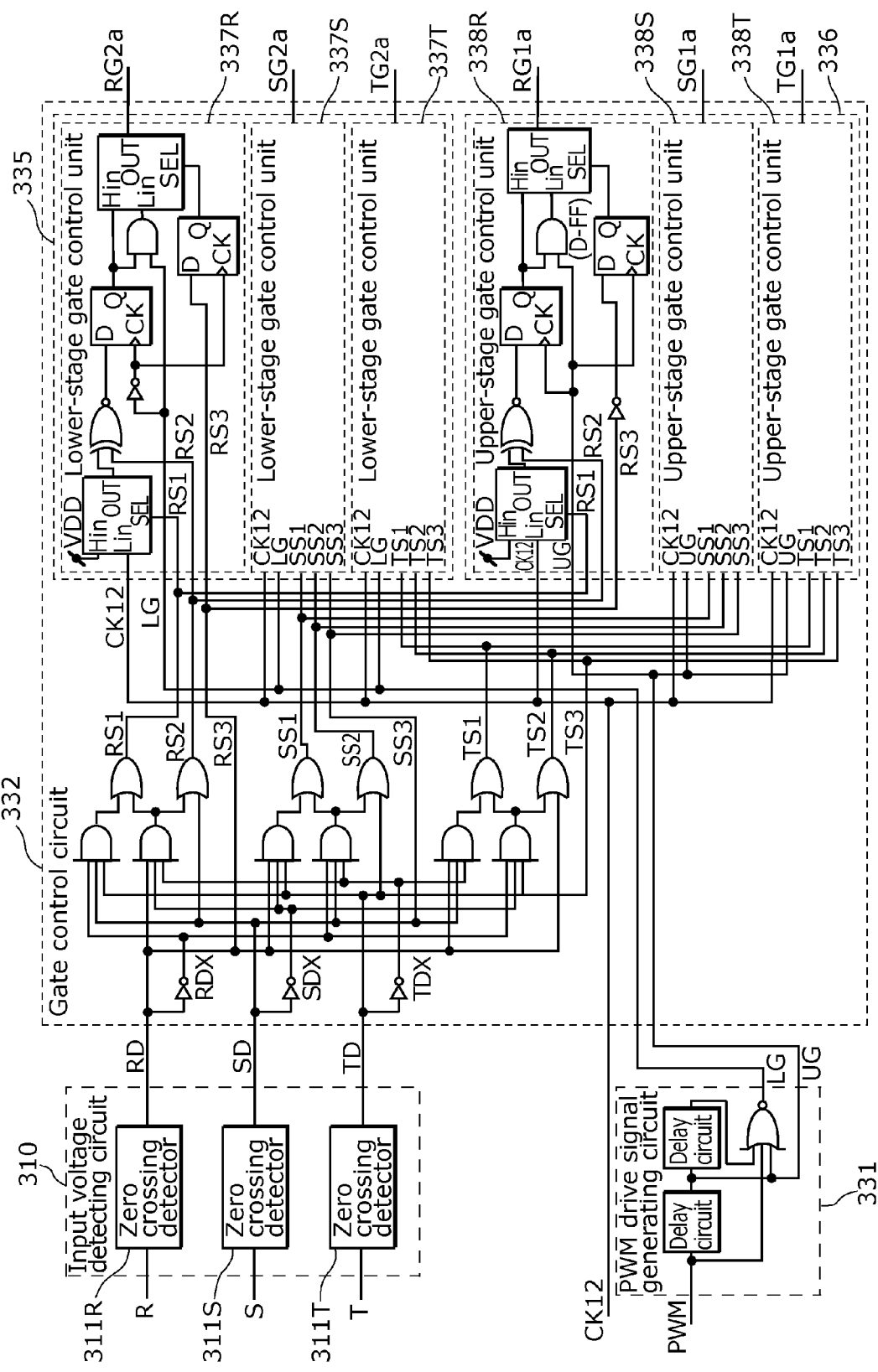
FIG. 10 is a circuit diagram of a gate control circuit and so on according to Embodiment 4 of the present disclosure.

FIG. 10 is a diagram which illustrates a detailed configuration of the input voltage detecting circuit 310, the PWM drive signal generating circuit 331, and the gate control circuit 332 illustrated in FIG. 8. The following describes operations performed by them with reference to FIG. 10. It is to be noted that the polarity of each of the signals is not necessarily as illustrated below, but may be set arbitrarily within the scope of technical common knowledge.

The input voltage detecting circuit 310 includes: a zero crossing detectors 311R, 311S, and 311T for the AC power voltages R, S, and T, respectively, which are input to the terminal R, the terminal 5, and the terminal T, which are the AC input terminals 101. It is to be noted that, when the zero crossing detectors 311R, 311S, and 311T are not particularly discriminated, they are referred to as the zero crossing detectors 311. The zero crossing detector 311 outputs an H level when an input voltage is greater than or equal to 0 V, and outputs an L level when an input voltage is smaller than or equal to 0 V. The input voltage detecting circuit 310 detects zero crossing of each of the AC power voltages of the three-phase AC power using the three zero crossing detectors 311, and outputs gate control signals RD, SD, and TD, to the gate control circuit 332.

The PWM drive signal generating circuit 331 processes the PWM control signal transmitted from the PWM control unit 320 which is not illustrated in FIG. 10, in a circuit including a delay circuit illustrated in FIG. 10 to generate two PWM drive signals "UG" and "LG". More specifically, as illustrated in FIG. 9, the "UG" and the "LG" are signals synchronized with the "PWM". In addition, when one of the "UG" and "LG" is in an H level (active), the other is in an L level (inactive). In addition, there is a period during which both of the "UG" and "LG" are in the L level between a period during which one of the "UG" and "LG" is in the H level and a period during which the other is in the L level.

Furthermore, as described above, the "UG" and the "LG" are equivalent to the PWM drive signal used in the general half bridge inverter circuit illustrated in FIG. 11 described below. The "UG" is a drive signal of the switching element of an upper arm of the inverter, and the "LG" is a drive signal of the switching element of a lower arm of the inverter. In the matrix converter control apparatus 300 according to Embodiment 4 of the present disclosure, the "UG" and the "LG" are used for generating a gate voltage signal which drives the AC switch 104 in the direct conversion circuit 100.

The gate control circuit 332 includes three lower-stage gate control units 337R, 337S, and 337T, and three upper-stage gate control units 338R, 338S, and 338T, as illustrated in FIG. 10. It is to be noted that when the lower-stage gate control units 337R, 337S, and 337T are not particularly discriminated, they are referred to as the lower-stage gate control unit 337. Likewise, when the upper-stage gate control units 338R, 338S, and 338T, are not particularly discriminated, they are referred to as the upper-stage gate control units 338.

The three lower-stage gate control units 337 have the same circuit configuration. Likewise, the three upper-stage gate control units 338 have the same circuit configuration. The three lower-stage gate control units 337 generate lower-side gate signals "RG2a", "SG2a", and "TG2a" from which the above-described lower-side gate voltage signals "RG2", "SG2", and "TG2" of the direct conversion circuit 100 are generated. Likewise, the three upper-stage gate control units 338 generate upper-side gate signals "RG1a", "SG1a", and "TG1a" from which the above-described upper-side gate voltage signals "RG2", "SG2", and "TG2" of the direct conversion circuit 100 are generated.

Each of the lower-stage gate control units 337 performs signal processing, in the circuit illustrated in FIG. 10, on (i) the gate control signals "RD", "SD", and "TD" supplied from the input voltage detecting circuit 310, (ii) the PWM driving timing signal "CK12" supplied from the PWM control unit 320, and the PWM signal "LG" supplied from the PWM drive signal generating circuit 331, thereby generating the lower-side gate signals "RG2a", "SG2a", and "TG2a". Here, the lower-side gate signals "RG2a", "SG2a", and "TG2a" are signals which change with the same time timing as the lower-side gate voltage signals "RG2", "SG2", and "TG2" illustrated in FIG. 9.

Likewise, each of the upper-stage gate control units 338 performs signal processing, in the circuit illustrated in FIG. 10, on (i) the gate control signals "RD", "SD", and "TD" supplied from the input voltage detecting circuit 310, (ii) the PWM driving timing signal "CK12" supplied from the PWM control unit 320, and the PWM signal "UG" supplied from the PWM drive signal generating circuit 331, thereby generating the upper-side gate signals RG1a, SG1a, and TG1a. The upper side gate signals RG1a, SG1a, and TG1a are signals which change with the same time timing as the lower-side gate voltage signals "RG1", "SG1", and "TG1" illustrated in FIG. 9.

As described above, the input voltage detecting circuit 310, the PWM drive signal generating circuit 331, and the gate control circuit 332 which are illustrated in FIG. 10 are proper embodiments for implementing the timing waveform illustrated in FIG. 9. In addition, as can be seen from the embodiments, the matrix converter control apparatus 300 according to Embodiment 4 of the present disclosure is capable of implementing the matrix converter operation with a simple logic circuit without performing complicated digital processing, using the direct conversion circuit 100 according to Embodiment 1 to Embodiment 3 of the present disclosure.

It is to be noted that the output waveform of the matrix converter control apparatus 300 illustrated in FIG. 9 is a waveform diagram devised in consideration of the direct conversion circuit 100 according to the present disclosure when considering application of the direct conversion circuit 100 to the matrix converter 330. This concept is accomplished by extending a basic concept of the case where the AC switch 104 according to Embodiment 1 of the present disclosure is applied to a general inverter. The following describes this point. With this, it should be understood that how easily and intuitively a new matrix converter control apparatus 300 or a method of driving a matrix converter can be produced from a conventional inverter control apparatus or a conventional method of driving an inverter, by combining the direct conversion circuit 100 according to the present disclosure with the method of controlling the matrix converter or the matrix converter control apparatus 300 according to the present disclosure.

Figure 11:
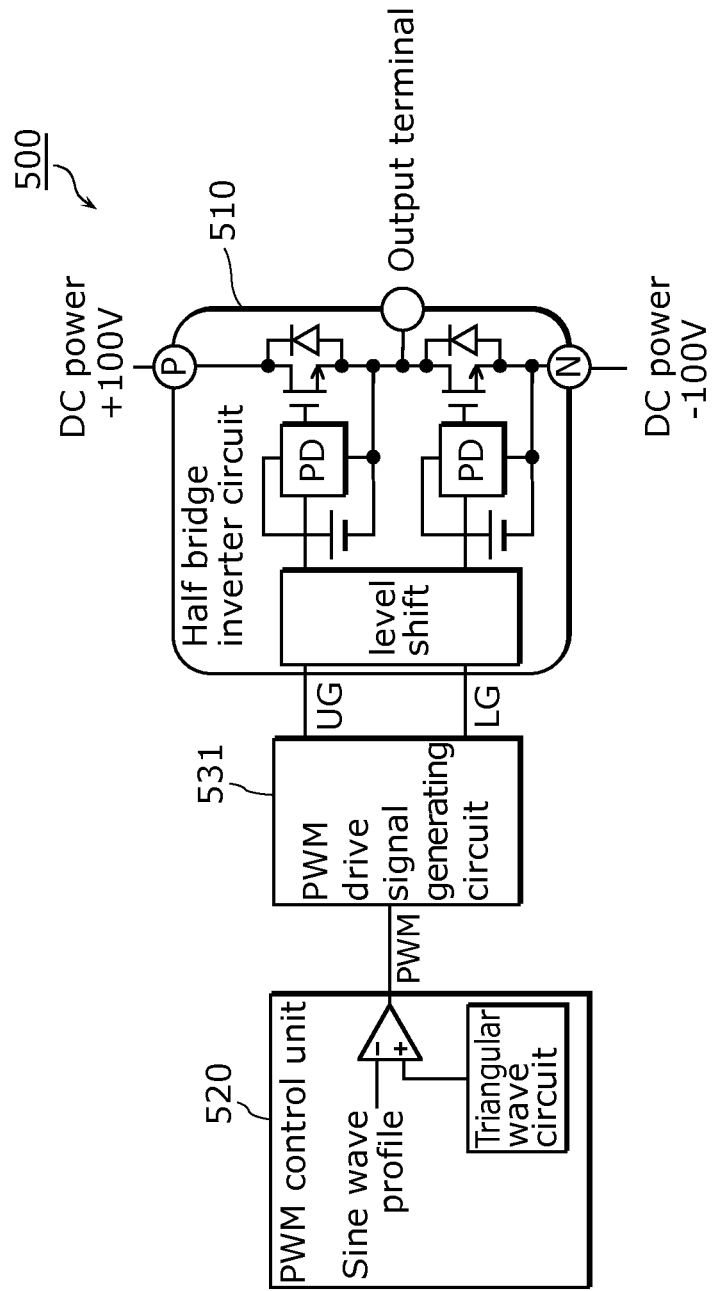
FIG. 11 is a block diagram of a general half bridge PWM output inverter control apparatus.

FIG. 11 is a block diagram of a conventional inverter control apparatus 500 of a half bridge PWM output. The inverter control apparatus 500 includes a half bridge inverter circuit 510, a PWM control unit 520, and a PWM drive signal generating circuit 531.

Here, a device such as a power MOSFET is assumed as a switching element in an output stage of the half bridge inverter circuit 510. The diode connected in parallel with the switching element means a diode parasitic in the power MOSFET and the like or an external free-wheel diode. These devices are connected to a DC input terminal P to which a high-voltage DC power voltage is supplied, a DC input terminal N to which a low-voltage DC power voltage is supplied, and an output terminal, in such a manner as illustrated in the half bridge inverter circuit 510 illustrated in FIG. 11.

The PWM control unit 520 is basically equivalent to the PWM control unit 320 of the matrix converter control apparatus 300 illustrated in FIG. 8 except that a PWM driving timing signal "CK12" is generated.

The PWM drive signal generating circuit 531 is equivalent to the PWM drive signal generating circuit 331 illustrated in FIG. 8. The PWM signal "UG" generated by the PWM drive signal generating circuit 531 drives the gate of a switching element of the upper arm via the level-shift circuit of the half bridge inverter circuit 510 and the pre-drive circuit of the upper arm. With this, the switching element of the upper arm is turned on. As a result, the output terminal is shorted to the DC input terminal P via the switching element of the upper arm.

The PWM signal "LG" generated by the PWM drive signal generating circuit 531 drives the gate of a switching element of the lower arm via the level-shift of the half bridge inverter circuit 510 and the pre-drive circuit of the lower arm. With this, the switching element of the lower arm is turned on. As a result, the output terminal is shorted to the DC input terminal N via the switching element of the lower arm.

When the two switching elements are simultaneously turned on, the above-described DC input terminal P and the DC input terminal N are shorted via the two switching elements, leading to through conditions in which a large current flows from the DC power voltage of a high-voltage to the DC power voltage of a low voltage. In order to prevent this state, two switching elements are switched between on and off after the two switching elements are off simultaneously. During the transition time of switching on and off of the two switching elements, the state where the two switching elements are off simultaneously is called dead time. Since both of the two switching elements are off during this period of time, a load current of inductive load connected to the output terminal flows to the DC input terminal P or the DC input terminal N via the above-described diode.

The operation of the inverter control apparatus 500 of a half bridge PWM output illustrated in FIG. 11 has been described above. Next, the timing waveform illustrated in FIG. 9 is reviewed, and an operational relevance between the matrix converter control apparatus 300 according to the present disclosure and the half bridge inverter circuit 510 in the inverter control apparatus 500 illustrated in FIG. 11 will be studied.

FIG. 12A, FIG. 12B, FIG. 12C, and FIG. 12D are diagrams each of which illustrates a gate status of the switching element 105 when the AC input electric angle is approximately 30 degrees, approximately 40 degrees, approximately 90 degrees, and approximately 100 degrees in FIG. 9.

Figure 12A:
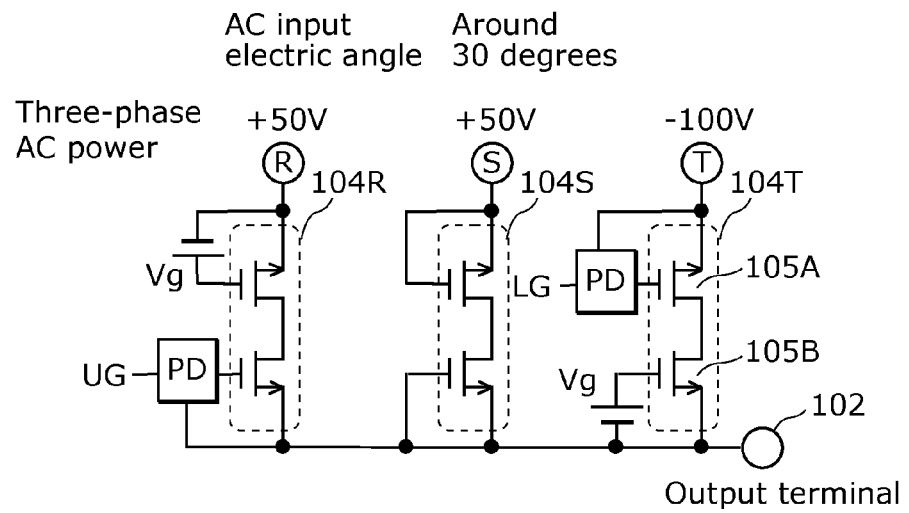
FIG. 12A is a diagram which illustrates an operational state of a switching element according to Embodiment 4 of the present disclosure.
Figure 12B:
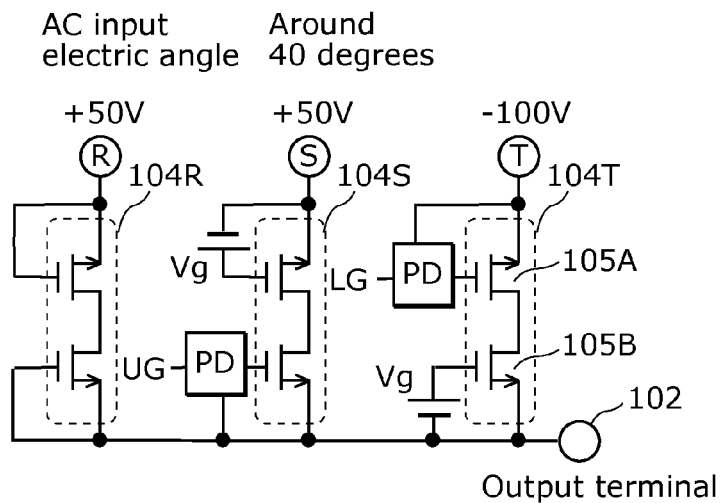
FIG. 12B is a diagram which illustrates an operational state of the switching element according to Embodiment 4 of the present disclosure.

In FIG. 12A, the terminal R to which +50 V is applied is regarded as the DC input terminal P of the half bridge inverter circuit 510 illustrated in FIG. 11, and the terminal T to which −100 V is applied is regarded as the DC input terminal N of the half bridge inverter circuit 510 illustrated in FIG. 11. Then, it can be seen from the description of FIG. 3B that the state of FIG. 12A is equivalent to the above-described inverter operation in the case where 50 V is applied to the DC input terminal P and −100 V is applied to the DC input terminal N in the half bridge inverter circuit 510 in FIG. 11. Likewise, in FIG. 12B as well, it can be seen that the equivalence is established by replacing the terminal R with the terminal S.

Figure 12C:
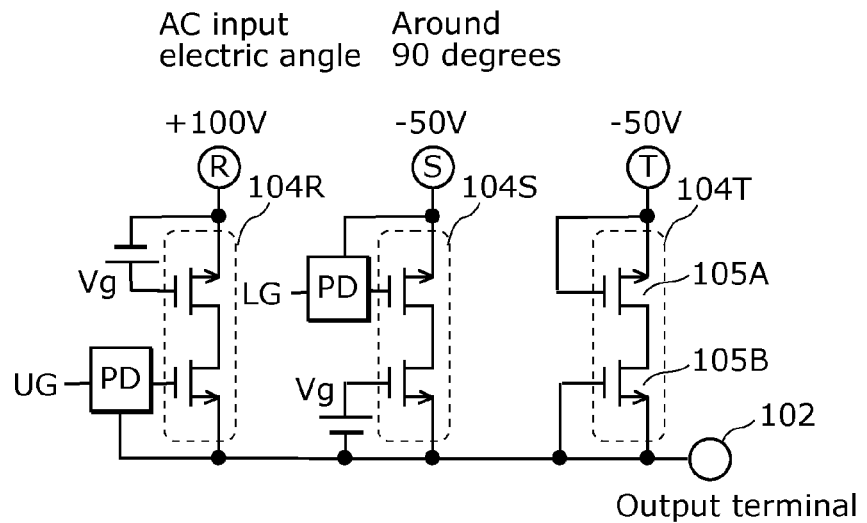
FIG. 12C is a diagram which illustrates an operational state of the switching element according to Embodiment 4 of the present disclosure.
Figure 12D:
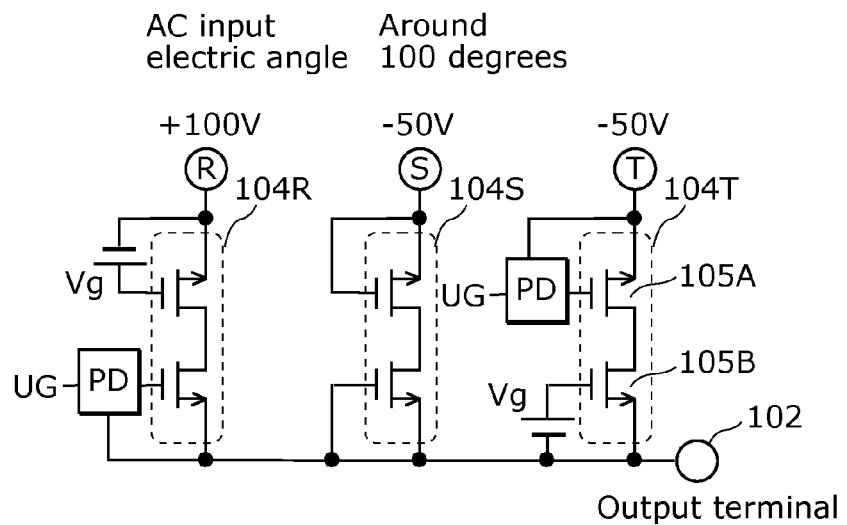
FIG. 12D is a diagram which illustrates an operational state of the switching element according to Embodiment 4 of the present disclosure.

In FIG. 12C and FIG. 12D, the terminal R to which +100 V is applied is regarded as the DC input terminal P of the half bridge inverter circuit 510 illustrated in FIG. 11. In the case of FIG. 12C, the terminal S to which −50 V is applied is regarded as the DC input terminal N of the half bridge inverter circuit 510 illustrated in FIG. 11. In the case of FIG. 12D, the terminal T to which −50 V is applied is regarded as the DC input terminal N of the half bridge inverter circuit 510 illustrated in FIG. 11. Then, it can be seen from the description of FIG. 3B that the state of each of FIG. 12C and FIG. 12D is equivalent to the above-described inverter operation in the case where 100 V is applied to the DC input terminal P and −50 V is applied to the DC input terminal N in the half bridge inverter circuit 510 in FIG. 11.

The following describes the first perspective in designing a matrix converter, which is obtained from the above description.

(The First Perspective in Designing a Matrix Converter)

When a measure can be established by which the direct conversion circuit 100 according to the present disclosure is replaced with the conventional half bridge inverter circuit 510, the PWM drive signals "UG" and "LG" in the conventional half bridge inverter circuit 510 are applied to two specified gate terminals among six gate terminals of the direct conversion circuit 100, and conditions for the other four gate terminals are properly set, it is possible to purposefully select two-phase AC power among three-phase AC power. Then, it is possible to perform an operation equivalent to the half bridge inverter circuit 510 between the selected powers.

When there is a measure for constantly properly provide the conditions of the six gate terminals of the direct conversion circuit 100, it is possible to implement, using the direct conversion circuit 100, the operation of: causing the AC power of a positive voltage of the three-phase AC power to constantly provide a current which drives a load; and causing the AC power of a negative voltage of the three-phase AC power to draw in the load current.

In the first perspective, it is confirmed that a load current can be obtained using the three-phase AC power as two DC powers of the half bridge inverter circuit 510 using the direct conversion circuit 100. However, since the three-phase AC power changes over time, it is necessary, in order to regard two powers extracted from the three-phase AC power as the DC powers, to establish a method to select the two powers and obtain the load current. When considering this as the second perspective in designing a matrix converter, the method described below is easy to intuitively understand as the method of selecting a power, and thus this method is used as the second perspective in the present disclosure.

(The Second Perspective in Designing a Matrix Converter)

The entire AC input angle, which is 360 degrees, of the three-phase AC power, is divided into six regions at every 60 degrees, and the phase of the AC power voltage whose absolute value is largest is selected in each of the regions.

When the AC power voltage in the phase with the largest absolute value is a negative voltage, the phase is set so as to be the DC input terminal N of the half bridge inverter circuit 510, and a power is selected so that the other two phases alternately serve as the DC input terminal P.

When the AC power voltage in the phase with the largest absolute value is a positive voltage, the phase is set so as to be the DC input terminal P of the half bridge inverter circuit 510, and a power is selected so that the other two phases alternately serve as the DC input terminal N.

In order to explain the second perspective, above-described FIG. 9 is referred to. In FIG. 9, the waveform illustrated by a broken line around 150 V above the three phase AC input terminal voltages is a waveform to be used for describing the above-described second perspective. When two powers are selected from the three AC powers and an equivalent operation to the half bridge inverter circuit 510 is performed based on the above-described second perspective, the voltage difference between the DC input terminal P and the DC input terminal N of this virtual half bridge inverter circuit has a shape of a dotted waveform. In other words, the dotted waveform is an average value of the power voltage of the virtual inverter. It is to be noted that the voltage value of the dotted waveform is not a perfect DC value with respect to the AC input electric angle but sufficiently capable of operating as a matrix converter. In addition, since negative feedback of a current amount is operated with respect to the load current generally in an actual use, it is not a problem that the voltage value of the dotted waveform is not a perfect DC value.

In addition, the above-described PWM driving timing signal CK12 is used for alternately exchanging two phases selected from among the AC powers of three phases, as the DC input terminal of the half bridge inverter circuit 510 of the second perspective in designing a matrix converter.

As described above, Embodiment 4 is related to a method of driving the direct conversion circuit and the matrix converter control apparatus which drives the direct conversion circuit according to the above-described Embodiments 1 to 3, and in particular to a matrix converter control apparatus of three-phase AC to single-phase PWM, which generates a single-phase AC output signal from a three-phase AC input signal using the PWM.

In Embodiment 4, the feature of the first perspective in designing the above-described matrix converter held by the direct conversion circuits 100 is utilized, and the method of selecting the three-phase AC power of the second perspective in designing the above-described matrix converter is employed. With this, it is possible to change the system from the driving system of the existing half bridge PWM inverter control apparatus 500 to the system of the matrix converter control apparatus 300 easily and intuitively with the configuration of the matrix converter control apparatus 300 in which the direct conversion circuit 100, the gate control circuit 332 of a simple logic circuit, and the input voltage detecting circuit 310 illustrated in FIG. 8 are just added to the conventional half bridge PWM output inverter control apparatus 500 illustrated in FIG. 11.

Embodiment 5

In Embodiment 5, description will be given as to a modification of the matrix converter control apparatus according to Embodiment 4 described above.

Figure 13:
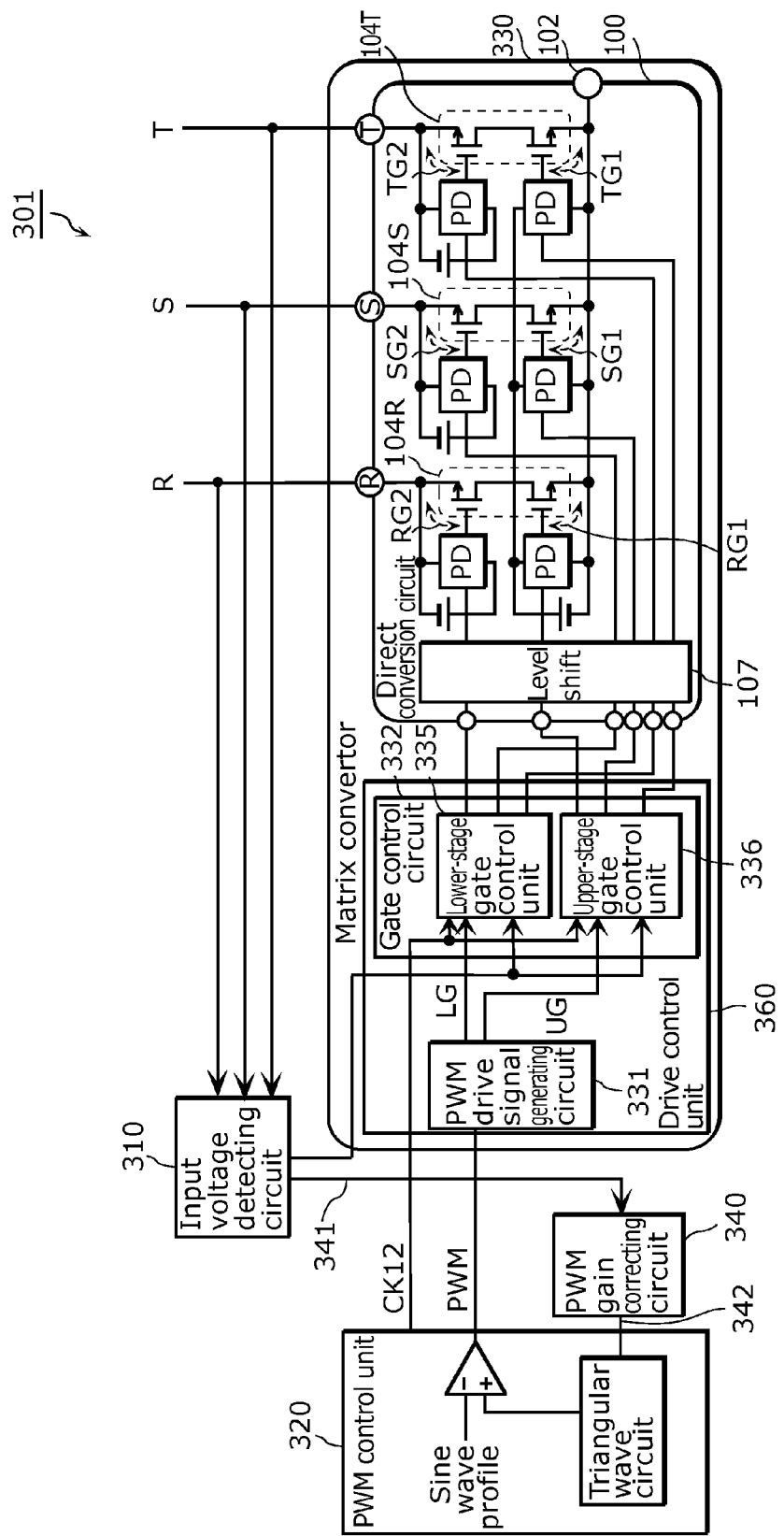
FIG. 13 is a block diagram of a matrix converter control apparatus according to Embodiment 5 of the present disclosure.

FIG. 13 is a block diagram of the matrix converter control apparatus 301 according to Embodiment 5. The matrix converter control apparatus 301 has a configuration in which a PWM gain correcting circuit 340 is added to the matrix converter control apparatus 300 according to Embodiment 4 illustrated in FIG. 8.

In the matrix converter control apparatus 301, the input voltage detecting circuit 310 generates a PWM output correcting signal 341 according to the relationship of the input amplitude voltage of each of the three-phase AC inputs. More specifically, the PWM output correcting signal 341 indicates an absolute value of a difference between the first phase signal having the largest absolute value among the three-phase AC signals and the second phase signal other than the first phase signal.

The PWM gain correcting circuit 340 generates a PWM gain correcting signal 342 according to the above-described PWM output correcting signal 341. The PWM gain correcting signal 342 is a signal for correcting a PWM control signal such that the single-phase AC signal generated by the direct conversion circuit 100 approximates the single-phase AC signal generated when the absolute value of the difference indicated by the PWM output correcting signal 341 is constant.

The PWM control unit 320 corrects a PWM duty of the PWM control signal according to the PWM gain correcting signal 342.

This series of operations function so as to correct the average value of power voltages of a virtual half bridge inverter circuit at the time when two powers are selected from the three AC powers illustrated by a broken line at the top in FIG. 9 and the half bridge inverter circuit operation is performed. With this, it is possible to cause the average value of the power voltage of the virtual half bridge inverter circuit to further approximate the DC value with respect to the AC input electric angle.

Although the correction to the average value of power voltages of the virtual half bridge inverter circuit has also been described in Embodiment 4, the correction is not important that much generally when negative feedback of a current amount is operated with respect to the load current. Meanwhile, in the control system of a matrix converter in which negative feedback of a current amount is not operated with respect to the load current, there is an advantageous effect of reducing ripple with respect to an AC electric angle of the load current.

Embodiment 6

In Embodiment 6, description will be given as to a matrix converter control apparatus of three-phase AC to two-phase PWM which generates a two-phase PWM signal from a three-phase AC voltage using the direct conversion circuit 100 of Embodiment 1 to Embodiment 3. It is to be noted that, the following describes mainly the differences from Embodiment 4, and omits overlapping description.

Figure 14:
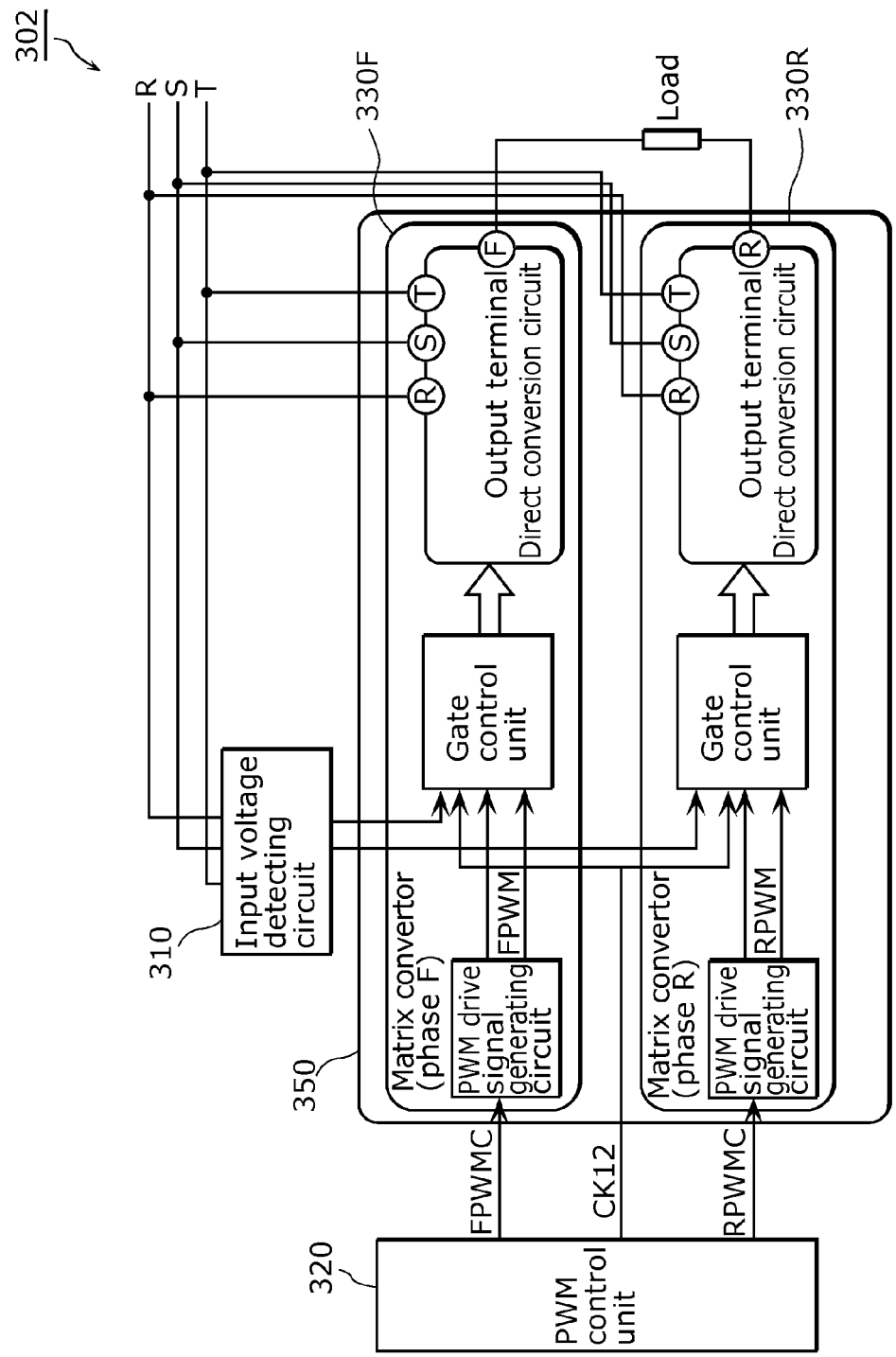
FIG. 14 is a block diagram of a matrix converter control apparatus according to Embodiment 6 of the present disclosure.

FIG. 14 is a block diagram of the matrix converter control apparatus 302 of three-phase AC to two-phase PWM according to Embodiment 6 of the present disclosure.

The matrix converter control apparatus 302 illustrated in FIG. 14 converts a three-phase AC signal using the pulse width modulation into a two-phase AC signal. The matrix converter control apparatus 302 includes: an input voltage detecting circuit 310; a PWM control unit 320; and a matrix converter 350 of the three-phase AC to two-phase PWM.

The matrix converter 350 of the three-phase AC to two-phase PWM includes two matrix converters 330F and 330R of three-phase AC to single-phase PWM. These matrix converters 330F and 330R each have a configuration equivalent to the configuration of the matrix converter 330 of three-phase AC to single-phase PWM illustrated in FIG. 8. The matrix converter control apparatus 302 drives the load connected between two output terminals of the two matrix converters 330F and 330R.

In addition, the function of the input voltage detecting circuit 310 illustrated in FIG. 14 is equivalent to the function of the input voltage detecting circuit 310 illustrated in FIG. 8. In addition, the PWM control unit 320 illustrated in FIG. 14 is different from the PWM control unit 320 illustrated in FIG. 8 in that a PWM control signal FPWMC which is supplied to the matrix converter 330F is generated and a PWM control signal RPWMC which is supplied to the matrix converter 330R is generated.

With this configuration, it is possible to implement the matrix converter control apparatus 302 of the three-phase AC to two-phase PWM which properly drives the direct conversion circuit 100 according to Embodiments 1 to 3 of the present disclosure.

Figure 15:
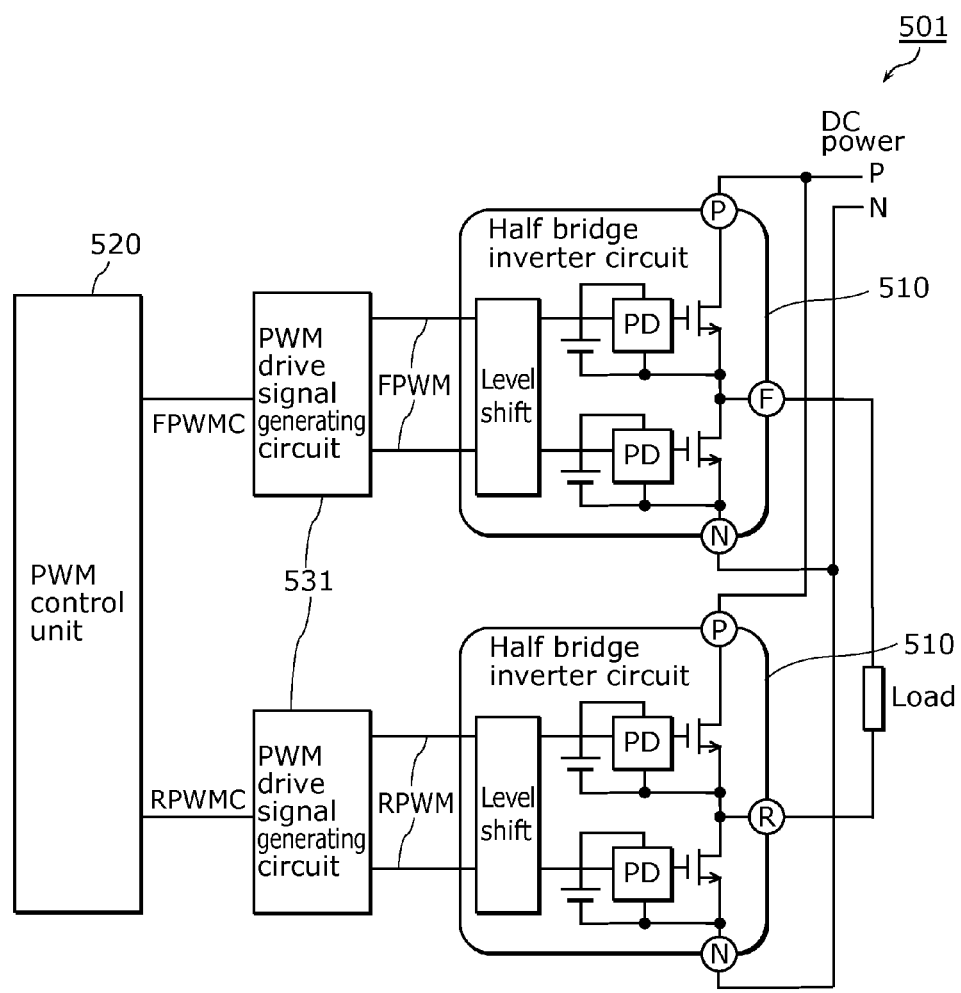
FIG. 15 is a block diagram of a general H bridge PWM output inverter control apparatus.

FIG. 15 is a block diagram which illustrates a configuration of a conventionally existing inverter control apparatus 501 of H-bridge PWM, which extracts AC power of an arbitrary frequency from a DC power.

In addition, the matrix converter control apparatus 302 according to Embodiment 6 has a feature that the system change can be easily performed to change the driving system of the inverter control apparatus 501 of H-bridge PWM illustrated in FIG. 15.

It is to be noted that the driving method of the matrix converter control apparatus 302 can be easily derived from the driving method of the inverter control apparatus 501 illustrated in FIG. 15 and the driving method and the designing method of the matrix converter control apparatus 300 described in Embodiment 4, and thus detailed description is omitted.

Embodiment 7

In Embodiment 7, description will be given as to the case where a modification equivalent to the above-described Embodiment 5 is applied to the matrix converter control apparatus according to Embodiment 6 described above.

Figure 16:
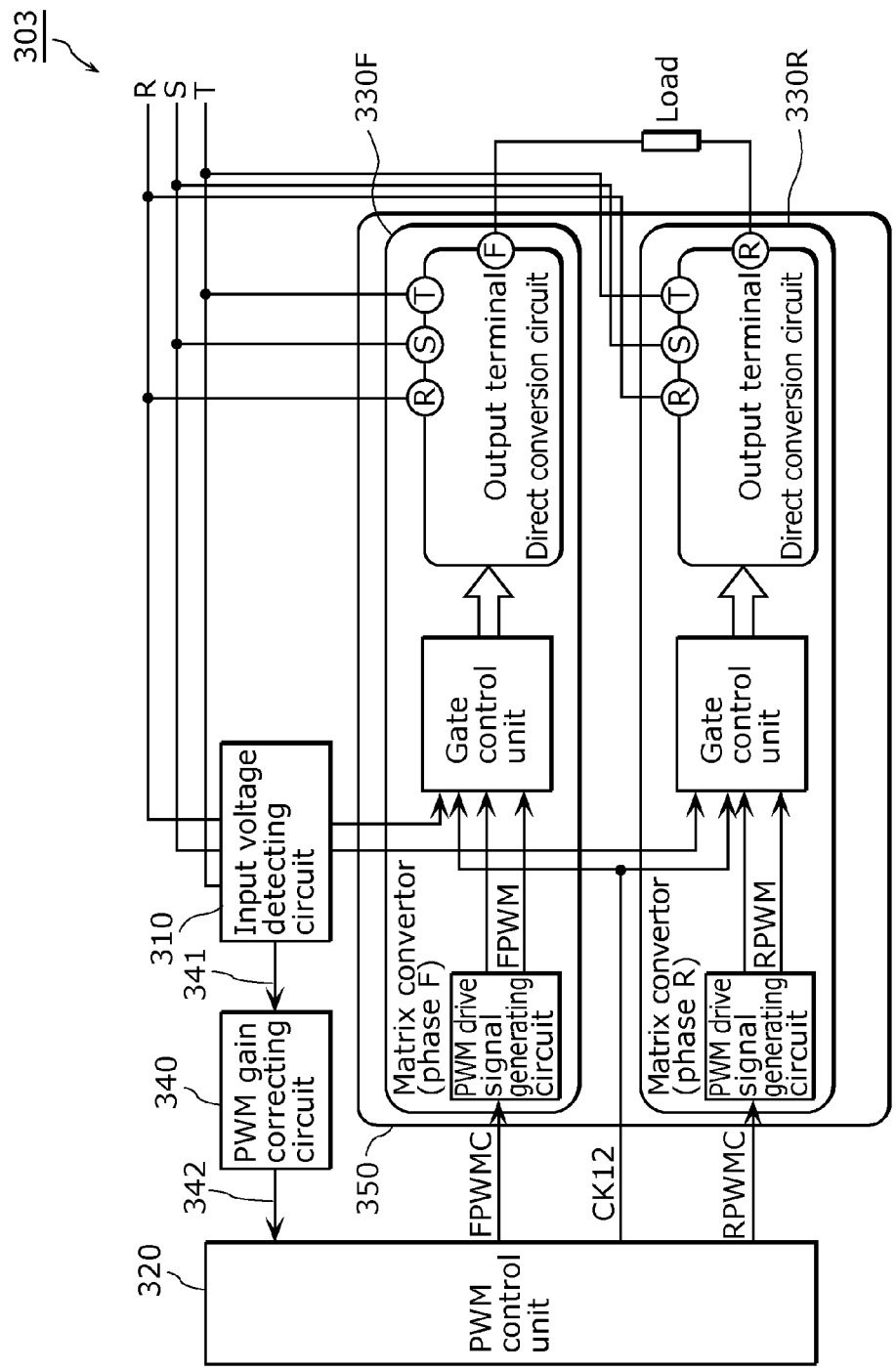
FIG. 16 is a block diagram of a matrix converter control apparatus according to Embodiment 7 of the present disclosure.

FIG. 16 is a block diagram of the matrix converter control apparatus 303 of three-phase AC to two-phase PWM according to Embodiment 7 of the present disclosure.

The matrix converter control apparatus 303 has a configuration in which a PWM gain correcting circuit 340 is added to the matrix converter control apparatus 302 according to Embodiment 6 illustrated in FIG. 14.

In the matrix converter control apparatus 303, the input voltage detecting circuit 310 generates a PWM output correcting signal 341 according to the relationship of the input amplitude voltage of each of the three-phase AC inputs. The PWM gain correcting circuit 340 generates a PWM gain correcting signal 342 for correcting the PWM control signals FPWMC and RPWMC generated by the PWM control unit 320 according to the above-described PWM output correcting signal 341. The PWM control unit 320 corrects a PWM duty of the PWM control signals FPWMC and RPWMC according to the PWM gain correcting signal 342.

This series of operations function so as to correct the average value of power voltages of a virtual half bridge inverter circuit at the time when two powers are selected from the three AC powers illustrated by a broken line at the top in FIG. 9 and the half bridge inverter circuit operation is performed. With this, it is possible to cause the average value of the power voltage of the virtual half bridge inverter circuit to further approximate the DC value with respect to the AC input electric angle.

Although the correction to the average value of power voltages of the virtual half bridge inverter circuit has also been described in Embodiment 4, the correction is not important that much generally when negative feedback of a current amount is operated with respect to the load current. Meanwhile, in the control system of a matrix converter in which negative feedback of a current amount is not operated with respect to the load current, there is an advantageous effect of reducing ripple with respect to an AC electric angle of the load current.

Embodiment 8

In Embodiment 8, description will be given as to a matrix converter control apparatus of three-phase AC to three-phase PWM which generates a three-phase PWM signal from a three-phase AC input signal using the direct conversion circuit 100 according to Embodiment 1 to Embodiment 3 described above.

Figure 17:
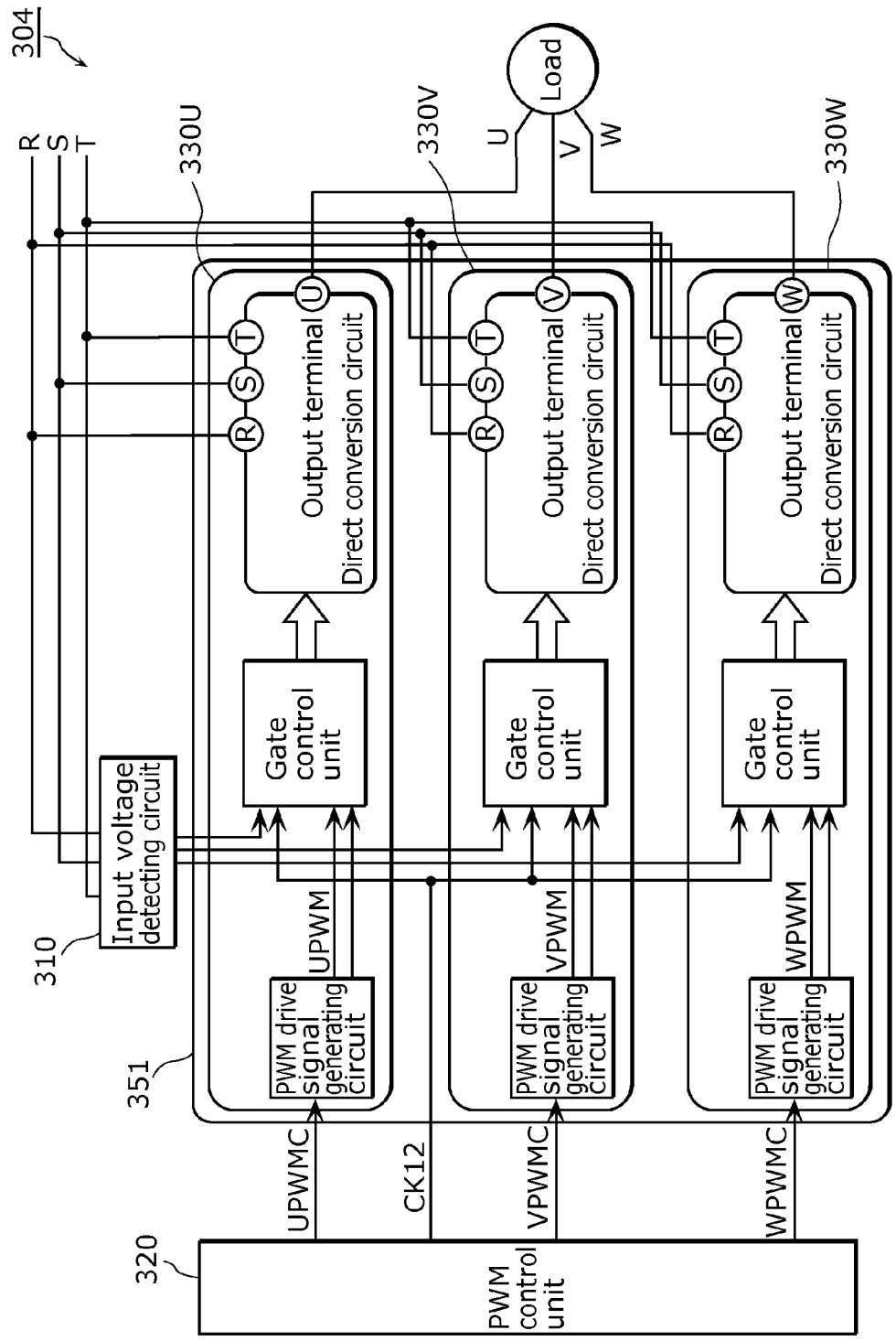
FIG. 17 is a block diagram of a matrix converter control apparatus according to Embodiment 8 of the present disclosure.

FIG. 17 is a block diagram of the matrix converter control apparatus 304 of three-phase AC to three-phase PWM according to Embodiment 8 of the present disclosure.

The matrix converter control apparatus 304 illustrated in FIG. 17 converts a three-phase AC signal using the pulse width modulation into a three-phase AC signal. The matrix converter control apparatus 304 includes: an input voltage detecting circuit 310; a PWM control unit 320; and a matrix converter 351 of the three-phase AC to three-phase PWM.

The matrix converter 351 of the three-phase AC to three-phase PWM includes three matrix converters 330U, 330V, and 330W of the three-phase AC to single-phase PWM. These matrix converters 330U, 330V, and 330W each have a configuration equivalent to the configuration of the matrix converter 330 of three-phase AC to single-phase PWM illustrated in FIG. 8. The matrix converter control apparatus 304 drives the load connected between three output terminals of the three matrix converters 330U, 330V, and 330W of the three-phase AC to single-phase PWM.

In addition, the function of the input voltage detecting circuit 310 illustrated in FIG. 17 is equivalent to the function of the input voltage detecting circuit 310 illustrated in FIG. 8. In addition, the PWM control unit 320 illustrated in FIG. 17 is different from the PWM control unit 320 illustrated in FIG. 8 in that a PWM control signal UPWMC which is supplied to the matrix converter 330U is generated, a PWM control signal VPWMC which is supplied to the matrix converter 330V is generated, and a PWM control signal WPWMC which is supplied to the matrix converter 330W is generated.

Figure 18A:
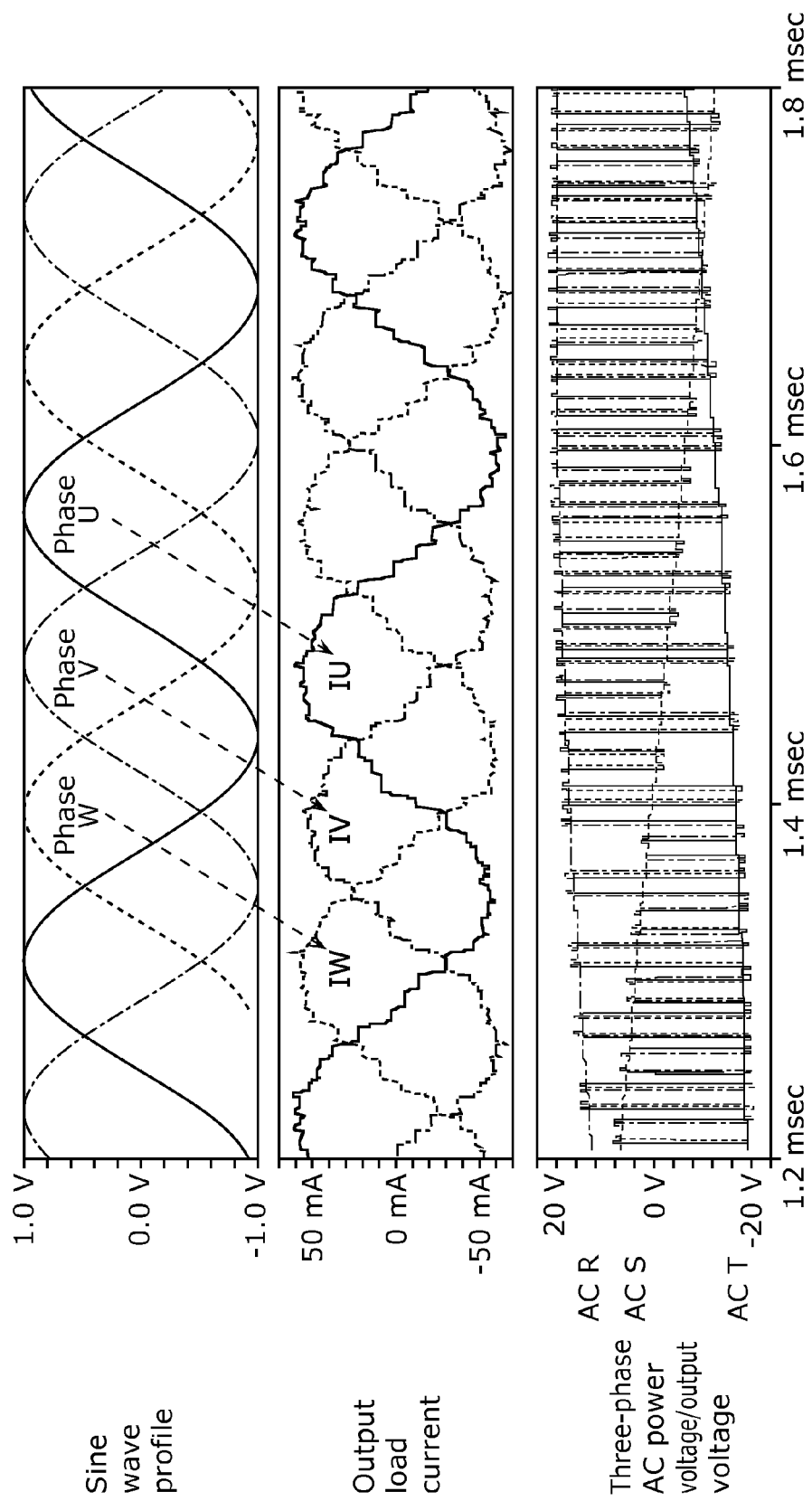
FIG. 18A is a diagram which illustrates a result of a transient analysis simulation of a matrix converter control apparatus according to Embodiment 8 of the present disclosure.
Figure 18B:
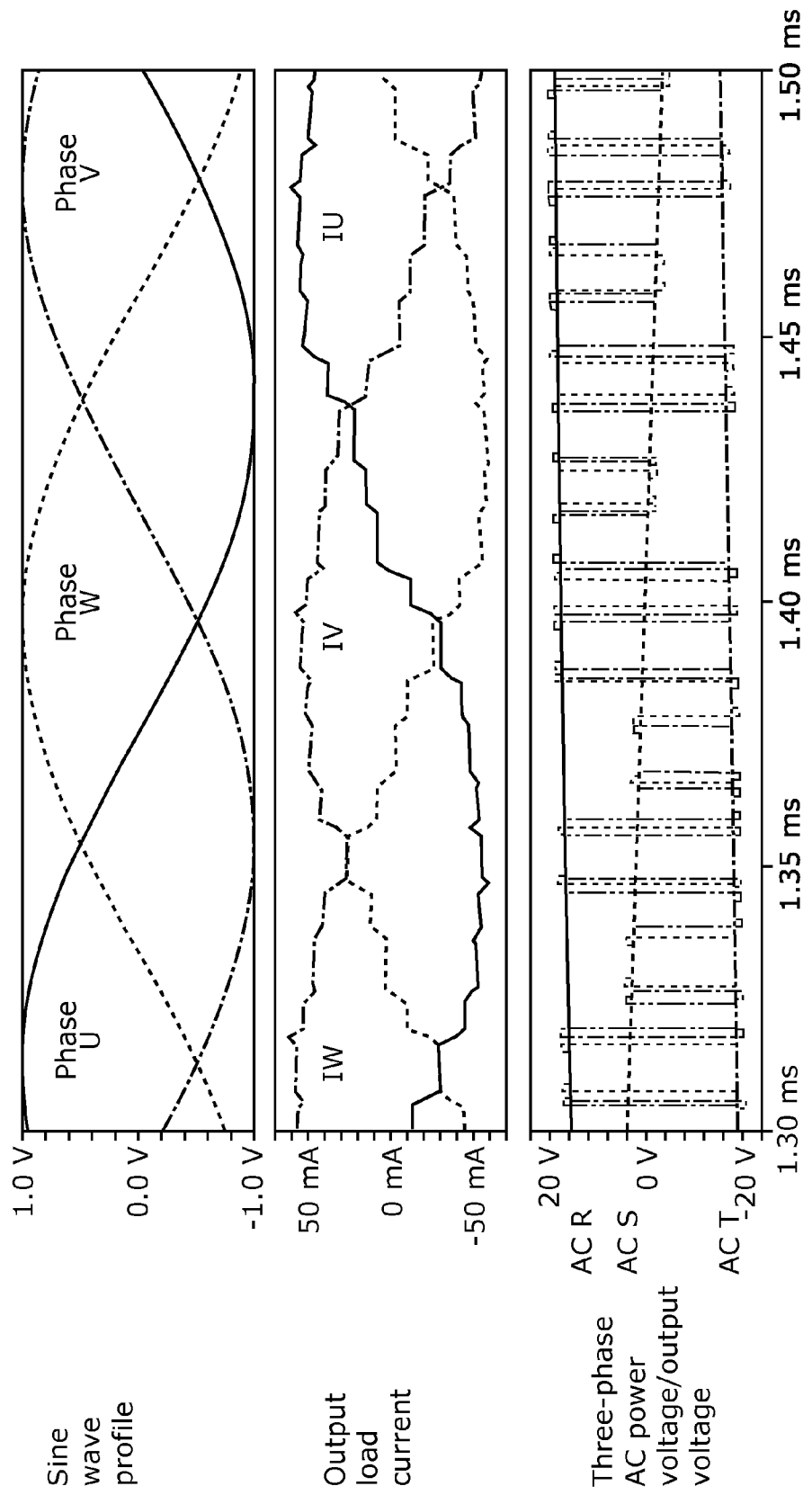
FIG. 18B is a diagram which illustrates a result of a transient analysis simulation of the matrix converter control apparatus according to Embodiment 8 of the present disclosure.

FIG. 18A and FIG. 18B each illustrate a result of operational verification of the matrix converter control apparatus 304 performed through transient analysis simulation using SPICE.

The simulation conditions are set as below for the purpose of shortening the time for studying the analysis of the transient analysis simulation.

(1) The frequency of the sine wave profile of each of the phases, which changes the PWM duty of the PWM control signal into a sine wave shape, is set to 4 KHz.

(2) The frequency of the AC power of each of the phases is set to 278 Hz, and the cycle is set to 3.6 msec. The AC power voltage amplitude is set to −20 V to +20 V.

(3) The carrier frequency of PWM driving is set to 50 KHz.

(4) The load of each of the phases of the three-phase inductive load which is connected by Y-connection to the output terminal U, the output terminal V, and the output terminal W is set to L=3 mH, R=10Ω.

The simulation result illustrated in FIG. 18A corresponds to a range of the AC input electric angles from 40 degrees to 100 degrees in the timing waveform diagram illustrated in FIG. 9. In addition, FIG. 18B is an enlarged view of FIG. 18A, and corresponds to the timing waveform of the AC input electric angles from 50 degrees to 70 degrees illustrated in FIG. 9.

In addition, in FIG. 18A and FIG. 18B, the waveform at the top indicates the sine wave profile of a phase U, a phase V, and a phase W.

The waveform in the middle in the diagram indicates the output load current of the phase U, the phase V, and the phase W. Here, the output load current is a load current that flows through three-phase inductive loads connected by Y-connection to the output terminal U, the output terminal V, and the output terminal W.

At the bottom in the diagram, three-phase AC power voltage waveform of R, S, and T and an output voltage waveform of the output terminal U, the output terminal V, and the output terminal W are illustrated.

As illustrated in FIG. 18A and FIG. 18B, regardless of the fact that the power voltages of an AC R, an AC S, and an AC T are each changed into a sine wave shape at the frequency of 278 Hz, the output load current of each of the phase U, the phase V, and the phase W changes into a sine wave shape at the frequency of 4 KHz following the signals of the sine wave profile of the phase U, the phase V, and the phase W. In addition, the PWM output waveform of each of the output terminal U, the output terminal V, and the output terminal W has substantially the same waveform shape as that illustrated in FIG. 9. As described above, the matrix converter control apparatus 304 of the three-phase AC to three-phase PWM operates properly.

With this configuration, it is possible to implement the matrix converter control apparatus 304 of the three-phase AC to three-phase PWM which properly drives the direct conversion circuit 100 according to Embodiments 1 to 3 of the present disclosure.

Figure 19:
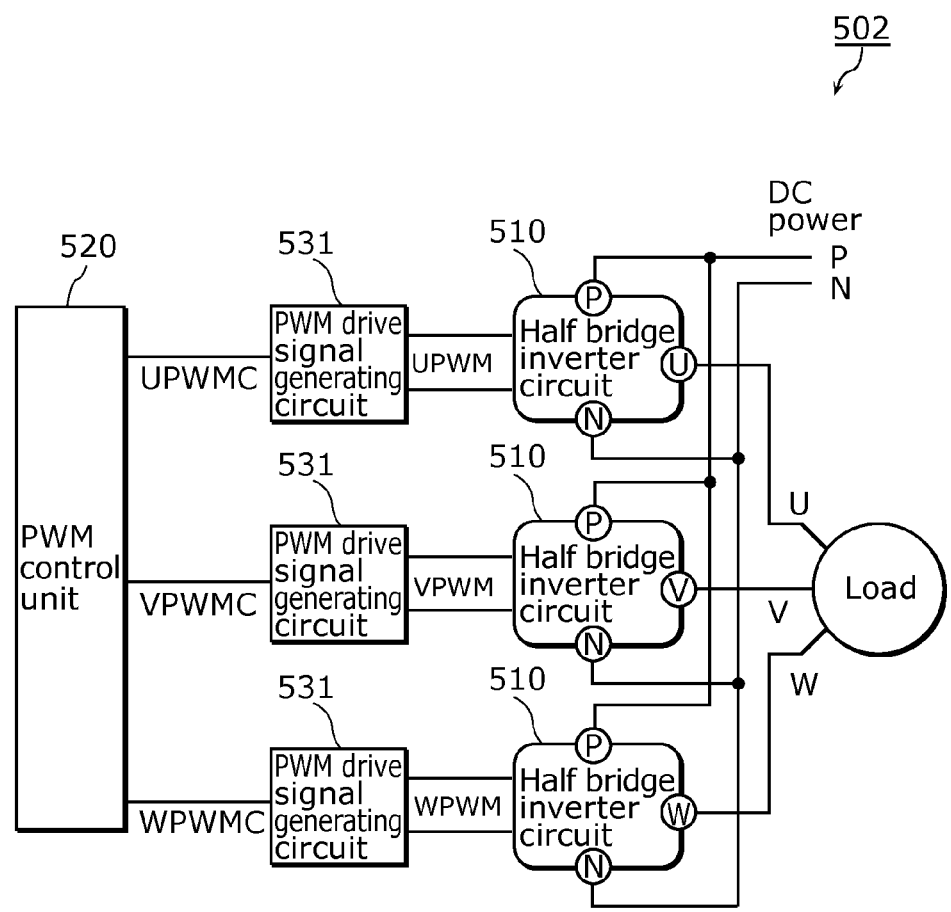
FIG. 19 is a block diagram of a general three-phase PWM inverter control apparatus.

FIG. 19 is a block diagram which illustrates a configuration of a conventionally existing H-bridge PWM inverter control apparatus 502 which extracts AC power of an arbitrary frequency from a DC power.

In addition, the matrix converter control apparatus 304 according to Embodiment 8 has a feature that the system change can be easily performed to change the driving system of the inverter control apparatus 502 illustrated in FIG. 19.

It is to be noted that the driving method of the matrix converter control apparatus 304 can be easily derived from the driving method of the inverter control apparatus 502 illustrated in FIG. 19 and the driving method and the designing method of the matrix converter control apparatus 300 described in Embodiment 4, and thus detailed description is omitted.

Embodiment 9

In Embodiment 9, description will be given as to the case where a modification equivalent to the above-described Embodiment 5 is applied to the matrix converter control apparatus according to Embodiment 8 described above.

Figure 20:
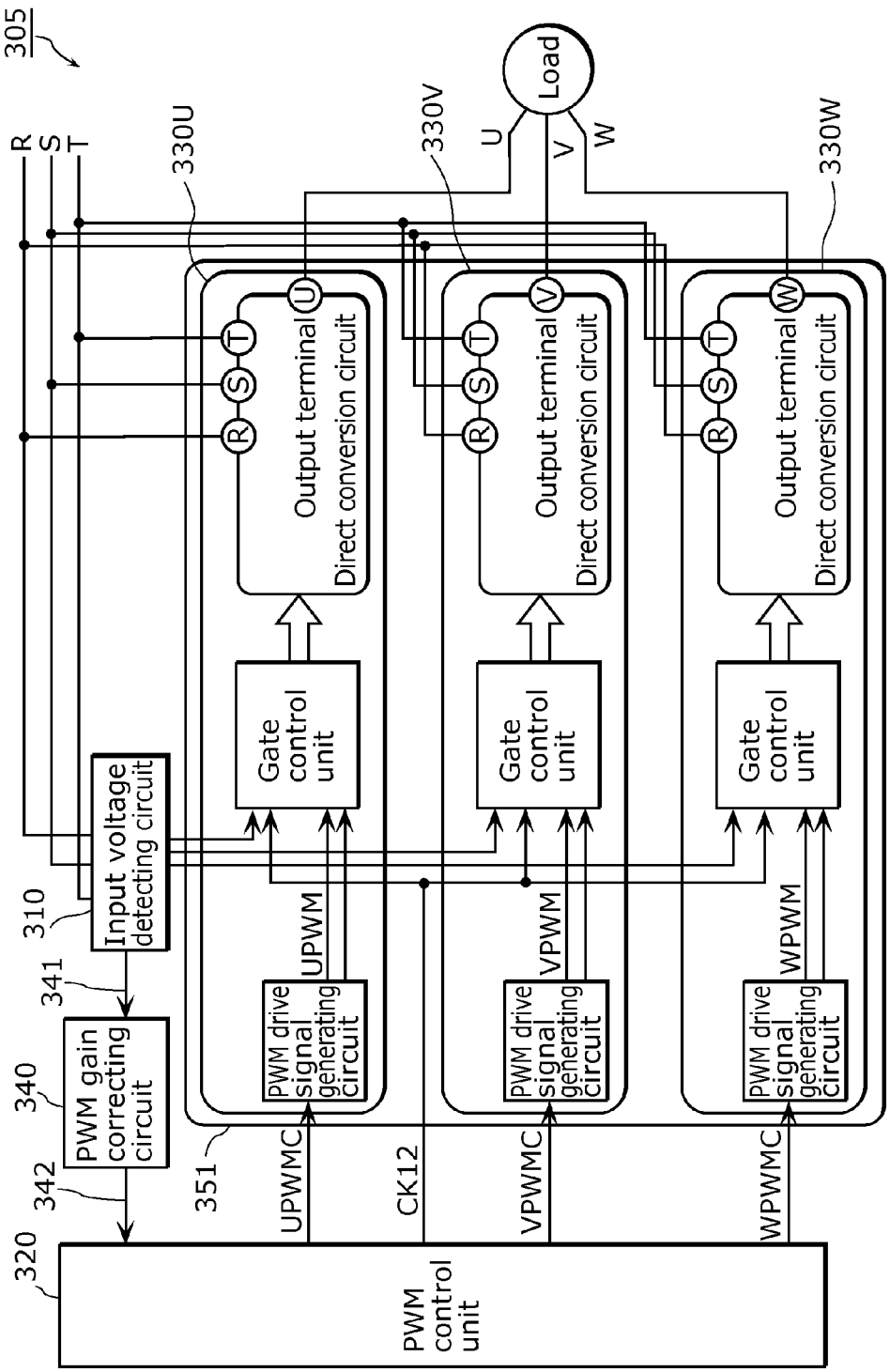
FIG. 20 is a block diagram of a matrix converter control apparatus according to Embodiment 9 of the present disclosure.
Figure 21:
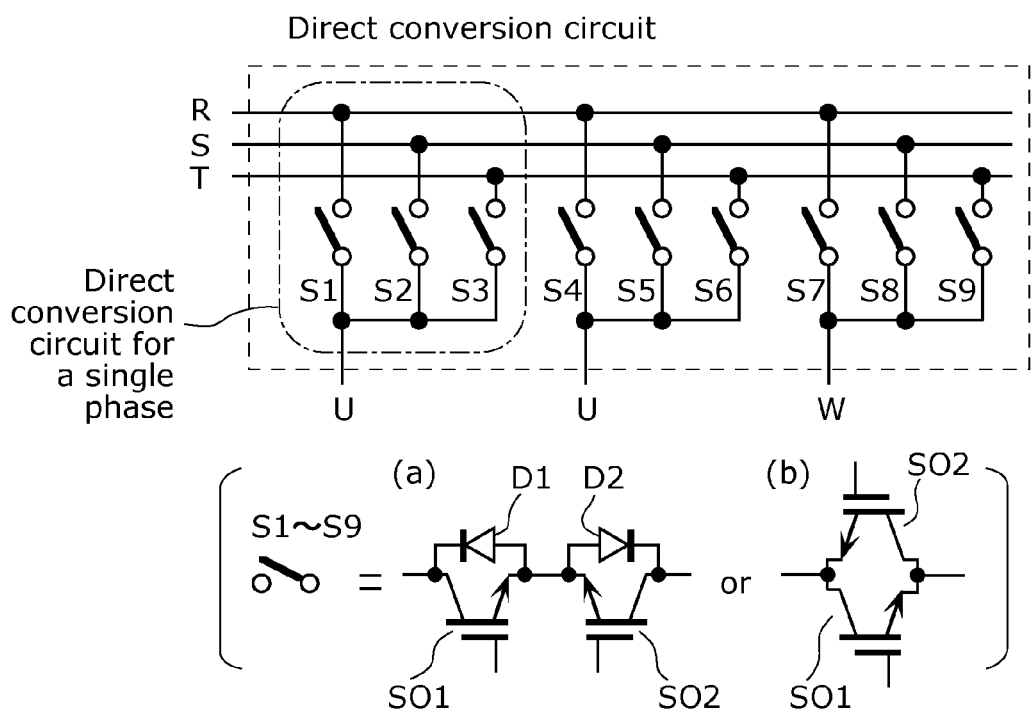
FIG. 21 is a diagram which illustrates a configuration of a conventional direct conversion circuit.

FIG. 20 is a block diagram of a matrix converter control apparatus 305 of three-phase AC to three-phase PWM according to Embodiment 9 of the present disclosure.

The matrix converter control apparatus 305 has a configuration in which a PWM gain correcting circuit 340 is added to the matrix converter control apparatus 304 according to Embodiment 8 illustrated in FIG. 17.

In the matrix converter control apparatus 305, the input voltage detecting circuit 310 generates a PWM output correcting signal 341 according to the relationship of the input amplitude voltage of each of the three-phase AC inputs. The PWM gain correcting circuit 340 generates a PWM gain correcting signal 342 for correcting the PWM control signals UPWMC, VPWMC, and WPWMC generated by the PWM control unit 320 according to the above-described PWM output correcting signal 341. The PWM control unit 320 corrects a PWM duty of the PWM control signals UPWMC, VPWMC, and WPWMC according to the PWM gain correcting signal 342.

This series of operations function so as to correct the average value of power voltages of a virtual half bridge inverter circuit at the time when two powers are selected from the three AC powers illustrated by a broken line at the top in FIG. 9 and the half bridge inverter circuit operation is performed. With this, it is possible to cause the average value of the power voltage of the virtual half bridge inverter circuit to further approximate the DC value with respect to the AC input electric angle.

Although the correction to the average value of power voltages of the virtual half bridge inverter circuit has also been described in Embodiment 4, the correction is not important that much generally when negative feedback of a current amount is operated with respect to the load current. Meanwhile, in the control system of a matrix converter in which negative feedback of a current amount is not operated with respect to the load current, there is an advantageous effect of reducing ripple with respect to an AC electric angle of the load current.

Although some exemplary embodiments of the present disclosure have been described in some detail above, the disclosure may change in the details of the configuration, and modifications of combination or order of elements are possible in the exemplary embodiments without materially departing from the scope and idea of the present disclosure.

In addition, each of the processing units included in the direct conversion circuit and the matrix converter control apparatus according to the above-described Embodiments is implemented typically as an LSI that is an integrated circuit. They may be realized as a single chip one-by-one, or as a single chip to include part or all of them.

Further, the integrated circuit is not limited to an LSI, and it may be embodied as a dedicated circuit or a general-purpose processor. It is also possible to use a filed programmable gate array (FPGA) which can be programmed in the field after manufacturing an LSI, or a reconfigurable processor in which connection and setting of circuit cells inside an LSI can be reconfigured.

In addition, it is also possible to combine at least part of the functions of the direct conversion circuit, the matrix converter control apparatus, and the modifications thereof according to the above-described Embodiments.

In addition, the numerals described above are used for exemplification to specifically describe the present disclosure, and the present disclosure is not limited by the numerals used for exemplification. In addition, the logic level represented by high/low or the switching status represented by on/off is presented as an example to specifically explain the present disclosure, and it is also possible to obtain an equivalent result with different combination of the exemplified logic level or switching status. In addition, the configuration of the above-described logic circuit is used for exemplification to specifically describe the present disclosure, and it is also possible to implement an equivalent input-output relationship with a logic circuit having a different configuration. In addition, the n-type, the p-type, and the like of the transistors and so on are used for exemplification to specifically describe the present disclosure, and it is also possible to obtain an equivalent result by inverting them. In addition, the relation of connection between the elements is used for exemplification to specifically describe the present disclosure, and the relation of connection which implements the functions of the present disclosure is not limited to this.

INDUSTRIAL APPLICABILITY

The present disclosure can be applied to the direct conversion circuit and the matrix converter control apparatus which drives the direct conversion circuit.

The invention claimed is:

1. A matrix converter control apparatus for converting a three-phase alternating current (AC) signal to a single-phase AC signal using pulse width modulation (PWM), the matrix converter control apparatus comprising
a matrix converter which includes a direct conversion circuit,
wherein the direct conversion circuit includes:
three AC input terminals to which the three-phase AC signal is supplied;
six gate signal input terminals to which six gate signals are provided;
an output terminal for outputting the single-phase AC signal; and
three AC switches each of which is connected between a corresponding one of the three AC input terminals and the output terminal,
each of the three AC switches includes a first switching element and a second switching element connected in series between the corresponding AC input terminal and the output terminal,
each of the first switching element and the second switching element includes a first terminal, a second terminal, and a gate terminal, and: passes a current from the first terminal to the second terminal or from the second terminal to the first terminal, according to a polarity of a voltage applied between the first terminal and the second terminal when a first voltage is higher than a threshold voltage, the first voltage being a voltage of the gate terminal with reference to a voltage of the first terminal; interrupts a current flowing from the second terminal to the first terminal when the first voltage is lower than or equal to the threshold voltage; and passes a current from the first terminal to the second terminal when the first voltage is lower than or equal to the threshold voltage and the voltage of the gate terminal is higher than or equal to the threshold voltage with reference to a voltage of the second terminal, the direct conversion circuit further includes six pre-drive circuits each of which (i) corresponds to a different pair of corresponding ones of six gate signals and the six switching elements, and (ii) supplies a voltage between the first terminal and the gate terminal of the switching element of the corresponding pair according to the gate signal of the corresponding pair, the six switching elements being included in the three AC switches, the matrix converter control apparatus further comprises:

a PWM control unit configured to generate a PWM control signal from which the six gate signals are generated, and supply the generated PWM control signal to the matrix converter; and an input voltage detecting circuit which detects a voltage value of each phase of the three-phase AC signal, the matrix converter further includes a drive control unit configured to (i) control the direct conversion circuit by generating the six gate signals using the PWM control signal, (ii) at predetermined intervals, determine, based on a result of detection performed by the input voltage detecting circuit, a first phase signal which is a signal of a phase in which a voltage has a highest absolute value in the three-phase AC signal, and select a second phase signal which is a signal other than the first phase signal in the three-phase AC signal, and a third phase signal which is a signal other than the first phase signal and the second phase signal in the three-phase AC signal, (iii) put a third AC switch into an interruption state, the third AC switch being one of the three AC switches and supplying the third phase signal to the output terminal via the AC input terminal, (iv) generate the single-phase AC signal to be output to the output terminal, from the first phase signal and the second phase signal, using a first AC switch and a second AC switch, the first AC switch being one of the three AC switches and supplying the first phase signal to the output terminal via the AC input terminal, and the second AC switch being one of the three AC switches and supplying the second phase signal to the output terminal via the AC input terminal, and (v) switch a signal to be determined as the second phase signal alternately between signals of two phases other than the first phase signal, at the predetermined intervals.

2. The matrix converter control apparatus according to claim 1, wherein the second terminal of the first switching element and the second terminal of the second switching element are connected to each other, the first terminal of the first switching element is connected to the output terminal, and the first terminal of the second switching element is connected to the AC input terminal.

3. The matrix converter control apparatus according to claim 1, wherein the first terminal of the first switching element and the first terminal of the second switching element are connected to each other, the second terminal of the first switching element is connected to the output terminal, and the second terminal of the second switching element is connected to the AC input terminal.

4. The matrix converter control apparatus according to claim 1, wherein each of the first switching element and the second switching element includes:

a semiconductor stacked body including a nitride semiconductor formed on a semiconductor substrate;

a first electrode and a second electrode formed, spaced from each other, on the semiconductor stacked body, the first electrode and the second electrode serving as the first terminal and the second terminal, respectively; and a gate electrode formed between the first electrode and the second electrode, the gate electrode serving as the gate terminal.

5. The matrix converter control apparatus according to claim 2, wherein each of the three switching elements includes:

a semiconductor stacked body including a nitride semiconductor formed on a semiconductor substrate;

a first electrode and a second electrode, spaced from each other, formed on the semiconductor stacked body, the first electrode and the second electrode serving as the first terminal of the first switching element and the first terminal of the second switching element, respectively; and two gate electrodes formed between the first electrode and the second electrode, each of the gate electrodes serving as the gate terminal of a corresponding one of the first switching element and the second switching element.

6. The matrix converter control apparatus according to claim 1, wherein the switching element is a metal-oxide semiconductor field-effect transistor (MOSFET).

7. The matrix converter control apparatus according to claim 1, wherein the input voltage detecting circuit generates a PWM output correcting signal indicating an absolute value of a difference between the first phase signal and the second phase signal, the matrix converter control apparatus further comprises a PWM gain correcting circuit which generates a PWM gain correcting signal for correcting the PWM control signal according to the PWM output correcting signal to cause the single-phase AC signal generated by the direct conversion circuit to approximate the single-phase AC signal generated when the absolute value of the difference is constant, and the PWM control unit is configured to correct a duty of the PWM control signal according to the PWM gain correcting signal.

8. A matrix convertor control apparatus for converting a three-phase alternating current (AC) signal to a two-phase AC signal using pulse width modulation (PWM), the matrix convertor control apparatus comprising:

a first matrix converter and a second matrix converter each of which includes a direct conversion circuit; and a PWM control unit, wherein each of the direct conversion circuits includes:

three AC input terminals to which the three-phase AC signal is supplied, six gate signal input terminals to which six gate signals are provided;

an output terminal for outputting a single-phase AC signal included in the two-phase AC signal; and three AC switches each of which is connected between a corresponding one of the three AC input terminals and the output terminal, each of the three AC switches includes a first switching element and a second switching element connected in series between the corresponding AC input terminal and the output terminal, each of the first switching element and the second switching element includes a first terminal, a second terminal, and a gate terminal, and: passes a current from the first terminal to the second terminal or from the second terminal to the first terminal, according to a polarity of a voltage applied between the first terminal and the second terminal when a first voltage is higher than a threshold voltage, the first voltage being a voltage of the gate terminal with reference to a voltage of the first terminal; interrupts a current flowing from the second terminal to the first terminal when the first voltage is lower than or equal to the threshold voltage; and passes a current from the first terminal to the second terminal when the first voltage is lower than or equal to the threshold voltage and the voltage of the gate terminal is higher than or equal to the threshold voltage with reference to a voltage of the second terminal, the direct conversion circuit further includes six pre-drive circuits each of which (i) corresponds to a different pair of corresponding ones of six gate signals and the six switching elements, and (ii) supplies a voltage between the first terminal and the gate terminal of the switching element of the corresponding pair according to the gate signal of the corresponding pair, the six switching elements being included in the three AC switches, the PWM control unit is configured to generate a first PWM control signal from which the six gate signals of the direct conversion circuit included in the first matrix converter are generated, and supply the generated first PWM control signal to the first matrix converter; and generate a second PWM control signal from which the six gate signals of the direct conversion circuit included in the second matrix converter are generated, and supply the generated second PWM control signal to the second matrix converter; and the matrix converter control apparatus further comprises:
an input voltage detecting circuit which detects a voltage value of each phase of the three-phase AC signal, the first matrix convertor further includes a first drive control unit configured to control the direct conversion circuit by generating the six gate signals using the first PWM control signal, and the second matrix convertor further includes a second drive control unit configured to control the direct conversion circuit by generating the six gate signals using the second PWM control signal, and each of the first drive control unit and the second drive control unit is configured to: at predetermined intervals, determine, based on a result of detection performed by the input voltage detecting circuit, a first phase signal which is a signal of a phase in which a voltage has a highest absolute value in the three-phase AC signal, and select a second phase signal which is a signal other than the first phase signal in the three-phase AC signal, and a third phase signal which is a signal other than the first phase signal and the second phase signal in the three-phase AC signal; put a third AC switch into an interruption state, the third AC switch being one of the three AC switches and supplying the third phase signal to the output terminal via the AC input terminal; and generate the single-phase AC signal to be output to the output terminal, from the first phase signal and the second phase signal, using a first AC switch and a second AC switch, the first AC switch being one of the three AC switches and supplying the first phase signal to the output terminal via the AC input terminal, and the second AC switch being one of the three AC switches and supplying the second phase signal to the output terminal via the AC input terminal, and the drive control unit is configured to switch a signal to be determined as the second phase signal alternately between the signals of two phases other than the first phase signal, at the predetermined intervals.

9. A matrix convertor control apparatus for converting a three-phase alternating current (AC) input signal to a three-phase AC output signal using pulse width modulation (PWM), the matrix convertor control apparatus comprising:
a first matrix converter, a second matrix converter, and a third matrix converter each of which includes a direct conversion circuit; and
a PWM control unit,
wherein each of the direct conversion circuits includes:
three AC input terminals to which the three-phase AC input signal is supplied;
six gate signal input terminals to which six gate signals are provided;
an output terminal for outputting a single-phase AC signal included in the three-phase AC output signal; and
three AC switches each of which is connected between a corresponding one of the three AC input terminals and the output terminal, each of the three AC switches includes a first switching element and a second switching element connected in series between the corresponding AC input terminal and the output terminal, each of the first switching element and the second switching element includes a first terminal, a second terminal, and a gate terminal, and: passes a current from the first terminal to the second terminal or from the second terminal to the first terminal, according to a polarity of a voltage applied between the first terminal and the second terminal when a first voltage is higher than a threshold voltage, the first voltage being a voltage of the gate terminal with reference to a voltage of the first terminal; interrupts a current flowing from the second terminal to the first terminal when the first voltage is lower than or equal to the threshold voltage; and passes a current from the first terminal to the second terminal when the first voltage is lower than or equal to the threshold voltage and the voltage of the gate terminal is higher than or equal to the threshold voltage with reference to a voltage of the second terminal, the direct conversion circuit further includes six pre-drive circuits each of which (i) corresponds to a different pair of corresponding ones of six gate signals and the six switching elements, and (ii) supplies a voltage between the first terminal and the gate terminal of the switching element of the corresponding pair according to the gate signal of the corresponding pair, the six switching elements being included in the three AC switches, the PWM control unit is configured to generate a first PWM control signal from which the six gate signals of the direct conversion circuit included in the first matrix converter are generated, supply the generated first PWM control signal to the first matrix converter, generate a second PWM control signal from which the six gate signals of the direct conversion circuit included in the second matrix converter are generated, supply the generated second PWM control signal to the second matrix converter, generate a third PWM control signal from which the six gate signals of the direct conversion circuit included in the third matrix converter are generated, and supply the generated third PWM control signal to the third matrix converter, and the matrix converter control apparatus further comprises an input voltage detecting circuit which detects a voltage value of each phase of the three-phase AC input signal, the first matrix convertor further includes a first drive control unit configured to control the direct conversion circuit by generating the six gate signals using the first PWM control signal, and the second matrix convertor further includes a second drive control unit configured to control the direct conversion circuit by generating the six gate signals using the second PWM control signal, the third matrix convertor further includes a third drive control unit configured to control the direct conversion circuit by generating the six gate signals using the third PWM control signal, and each of the first drive control unit, the second drive control unit, and the third drive control unit is configured to: at predetermined intervals, determine, based on a result of detection performed by the input voltage detecting circuit, a first phase signal which is a signal of a phase in which a voltage has a highest absolute value in the three-phase AC input signal, and select a second phase signal which is a signal other than the first phase signal in the three-phase AC input signal, and a third phase signal which is a signal other than the first phase signal and the second phase signal in the three-phase AC input signal, put a third AC switch into an interruption state, the third AC switch being one of the three AC switches and supplying the third phase signal to the output terminal via the AC input terminal, generate the single-phase AC signal to be output to the output terminal, from the first phase signal and the second phase signal, using a first AC switch and a second AC switch, the first AC switch being one of the three AC switches and supplying the first phase signal to the output terminal via the AC input terminal, and the second AC switch being one of the three AC switches and supplying the second phase signal to the output terminal via the AC input terminal, and the drive control unit is configured to switch a signal to be determined as the second phase signal alternately between the signals of two phases other than the first phase signal, at the predetermined intervals.

* * * * *